US011326891B2

(12) United States Patent
Choi et al.

(10) Patent No.: US 11,326,891 B2
(45) Date of Patent: May 10, 2022

(54) METHOD FOR PROVIDING IMAGE TO VEHICLE AND ELECTRONIC DEVICE THEREFOR

(71) Applicant: Samsung Electronics Co., Ltd., Gyeonggi-do (KR)

(72) Inventors: Jinyoung Choi, Gyeonggi-do (KR); Yongjun Lim, Gyeonggi-do (KR); Jaemo Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 16/520,725

(22) Filed: Jul. 24, 2019

(65) Prior Publication Data
US 2020/0064142 A1 Feb. 27, 2020

(30) Foreign Application Priority Data
Aug. 21, 2018 (KR) .................. 10-2018-0097647

(51) Int. Cl.
G01C 21/34 (2006.01)
G07C 5/00 (2006.01)

(52) U.S. Cl.
CPC ......... *G01C 21/3415* (2013.01); *G07C 5/008* (2013.01)

(58) Field of Classification Search
CPC ..................... G01C 21/3415; G07C 5/008
USPC .......................................... 701/410
See application file for complete search history.

(56) References Cited

U.S. PATENT DOCUMENTS

| 5,652,706 A * | 7/1997 | Morimoto ......... G01C 21/3415 340/460 |
| 9,842,496 B1 * | 12/2017 | Hayward ................. H04Q 9/00 |
| 10,643,391 B2 * | 5/2020 | Rober ................... B60W 10/18 |
| 2002/0165664 A1 * | 11/2002 | Park ................... G01C 21/3629 701/468 |

(Continued)

FOREIGN PATENT DOCUMENTS

| CN | 105744358 A * | 7/2016 | |
| JP | 2017049319 A * | 3/2017 | ............... G09G 3/20 |

(Continued)

OTHER PUBLICATIONS

Yoichi et al., "Modeling Environments from a Route Perspective," 2011, Publisher: IEEE.*
Javier et al., "Predictive Routing for Autonomous Mobility-On-Demand Systems with Ride-Sharing," 2017, Publisher: IEEE.*

(Continued)

*Primary Examiner* — Tuan C To
(74) *Attorney, Agent, or Firm* — Cha & Reiter, LLC

(57) ABSTRACT

Disclosed is a method for providing images to a vehicle and an electronic device therefor. An image providing method according to an embodiment includes operations of: acquiring a peripheral environment image of a second route based on a user input, where the second route is different from a traveling route of a vehicle communicating with an electronic device; acquiring vehicle-related information of the vehicle that includes information regarding the traveling route of the vehicle, information regarding a traveling state of a vehicle, and/or information regarding an environment of a vehicle; and generating a virtual peripheral environment image that reflects a traveling situation of a vehicle by converting a peripheral environment image of a second route based on vehicle-related information. Various other embodiments inferable from the disclosure are also possible.

20 Claims, 22 Drawing Sheets

(56) References Cited

U.S. PATENT DOCUMENTS

| | | | | |
|---|---|---|---|---|
| 2003/0216858 A1* | 11/2003 | Sakai | ................. | G01C 21/3626 |
| | | | | 701/428 |
| 2010/0172543 A1* | 7/2010 | Winkler | .................. | G08G 1/04 |
| | | | | 382/104 |
| 2014/0163877 A1* | 6/2014 | Kiyama | ............. | G01C 21/3697 |
| | | | | 701/533 |
| 2016/0005199 A1 | 1/2016 | Park | | |
| 2017/0221366 A1* | 8/2017 | An | ................... | G08G 1/096783 |
| 2017/0276494 A1 | 9/2017 | Sun et al. | | |
| 2017/0276499 A1 | 9/2017 | Sun et al. | | |
| 2017/0278402 A1 | 9/2017 | Yalla et al. | | |
| 2018/0089900 A1 | 3/2018 | Rober et al. | | |
| 2018/0259349 A1* | 9/2018 | Kusano | ................ | G01C 21/365 |
| 2018/0299285 A1* | 10/2018 | Morita | ............. | G08G 1/096811 |
| 2019/0316919 A1* | 10/2019 | Keshavamurthy | .......................... | |
| | | | | G08G 1/096838 |

FOREIGN PATENT DOCUMENTS

| | | | | |
|---|---|---|---|---|
| KR | 10-2017-0015112 A | 2/2017 | | |
| WO | WO-2015132957 A1 * | 9/2015 | ........... | G09G 3/3406 |
| WO | WO-2017118078 A1 * | 7/2017 | ............. | G09G 5/005 |
| WO | WO-2018066446 A1 * | 4/2018 | ............... | G06F 1/32 |
| WO | WO-2018135315 A1 * | 7/2018 | ........... | H04N 5/2354 |

OTHER PUBLICATIONS

Newcomb; "Technology is about to fog your car's windows—with ads"; Aug. 5, 2018; XP055655197.
European Search Report dated Feb. 3, 2020.

\* cited by examiner (5-a)

(5-b)

METHOD FOR PROVIDING IMAGE TO VEHICLE AND ELECTRONIC DEVICE THEREFOR

CROSS-REFERENCE TO RELATED APPLICATION(S)

This application is based on and claims priority under 35 U.S.C. 119 to Korean Patent Application No. 10-2018-0097647, filed on Aug. 21, 2018, in the Korean Intellectual Property Office, the disclosure of which is herein incorporated by reference in its entirety.

BACKGROUND

1. Technical Field

Certain embodiments disclosed in this document generally relate to methods for displaying images through a display of a vehicle and an electronic device therefor.

Particularly, in one example, a method is provided for displaying images through a display of a self-driving car and a device therefor.

2. Description of Related Art

In line with growing interest in self-driving cars, technologies enabling various types of multimedia playback during self-driving are drawing attention.

In addition, vehicles may conduct wireless communication with external devices for the purpose of the self-driving and multimedia playback. Wireless communication technologies for self-driving vehicles include V2X and precise positioning technologies. V2X, an acronym of vehicle-to-everything, refers to wireless communication technology for connecting a traveling vehicle with, for example, another vehicle in the vicinity, traffic infrastructure, external servers, pedestrians, etc. Thus, V2X may include vehicle-to-vehicle (V2V) communication which enables communication between vehicles, vehicle-to-infrastructure (V2I) communication which enables communication with infrastructure such as traffic infrastructure, vehicle-to-pedestrian (V2P) communication which enables communication with pedestrians, and the like.

SUMMARY

In conventional non-self-driving cars, the driver may look out through the front and side windows provided on the vehicle to see the environment immediately external to the vehicle.

However, when the vehicle is traveling along a congested road or traveling across places with complicated or contaminated environments, occupants of the vehicle may want to see different kinds of scenery through the windows. For example, if the vehicle is currently traveling along a congested road, the occupants may want to see a more relaxing scenery, such as that of a seaside. The occupants of the vehicle may also want to preview the scenery at a location on the route ahead of the vehicle's current location.

Accordingly, vehicle occupants may request display of the scenery of a desired region through the windows of the vehicle.

Particularly, while the vehicle is self-driving, the inner environment of the vehicle may be used as a new platform capable of providing various kinds of entertainment. For example, the windshield and side windows of the vehicle may be used to display contents in an immersive manner.

Certain embodiments disclosed in this document provide methods for showing vehicle occupants the peripheral environment of a desired region by using the display of the vehicle and an electronic device therefor.

According to an embodiment, a method for providing an image by an electronic device includes: acquiring a peripheral environment image of a second route based on a user input, where the second route is different from a traveling route of a vehicle communicating with the electronic device; acquiring vehicle-related information of the vehicle that includes at least one of information regarding the traveling route of the vehicle, information regarding a traveling state of the vehicle, and/or information regarding an environment of the vehicle; generating a virtual peripheral environment image that reflects a traveling situation of the vehicle by converting the acquired peripheral environment image of the second route based on the acquired vehicle-related information; and providing the generated virtual peripheral environment image to the vehicle.

According to an embodiment, a method for displaying an image by a vehicle includes: receiving a user input for selecting a second route different from a traveling route of the vehicle; acquiring a peripheral environment image of the second route based on the user input; acquiring vehicle-related information that includes at least one of information regarding the traveling route of the vehicle, information regarding a traveling state of the vehicle, and/or information regarding an environment of the vehicle; generating a virtual peripheral environment image that reflects a traveling situation of the vehicle by converting the acquired peripheral environment image of the second route based on the acquired vehicle-related information; and displaying the generated virtual peripheral environment image.

According to an embodiment, an electronic device includes: an image acquisition unit configured to acquire a peripheral environment image of a second route based on a user input, where the second route is different from a traveling route of a vehicle communicating with the electronic device; a vehicle information acquisition unit configured to acquire vehicle-related information of the vehicle that includes at least one of information regarding the traveling route of the vehicle, information regarding a traveling state of the vehicle, and/or information regarding an environment of the vehicle; an image processing unit configured to generate a virtual peripheral environment image that reflects a traveling situation of the vehicle by converting the acquired peripheral environment image of the second route based on the acquired vehicle-related information; and an image provision unit configured to provide the generated virtual peripheral environment image to the vehicle.

According to an embodiment, a vehicle includes: a user input unit capable of receiving a user's input; a display capable of displaying an image; a driving unit configured to control traveling of the vehicle; and an electronic device electrically connected to the user input unit, the display, and the driving unit, wherein the electronic device is configured to: acquire a peripheral environment image of a second route based on a user input, where the second route is different from a traveling route of the vehicle through the user input unit; acquire vehicle-related information of the vehicle that includes at least one of information regarding the traveling route of the vehicle, information regarding a traveling state of the vehicle, and/or information regarding an environment of the vehicle; generate a virtual peripheral environment image that reflects a traveling situation of the vehicle by converting the acquired peripheral environment image of the second route based on the acquired vehicle-related information; and provide the generated virtual peripheral environment image to the display.

According to an embodiment, a computer program product including a computer-readable storage medium includes instructions configured to cause an electronic device communicating with a vehicle to: acquire a peripheral environment image of a second route based on a user input, where the second route is different from a traveling route of the vehicle; acquire vehicle-related information of the vehicle that includes at least one of information regarding the traveling route of the vehicle, information regarding a traveling state of the vehicle, and/or information regarding an environment of the vehicle; generate a virtual peripheral environment image that reflects a traveling situation of the vehicle by converting the acquired peripheral environment image of the second route based on the acquired vehicle-related information; and provide the generated virtual peripheral environment image to the vehicle.

In addition, various advantageous effects inferable from this document directly or indirectly may be provided.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of the disclosure will be more apparent from the following detailed description taken in conjunction with the accompanying drawings, in which.

In connection with description of the drawings, identical or similar constituent elements may be denoted by identical or similar reference numerals.

DETAILED DESCRIPTION

Figure 1:
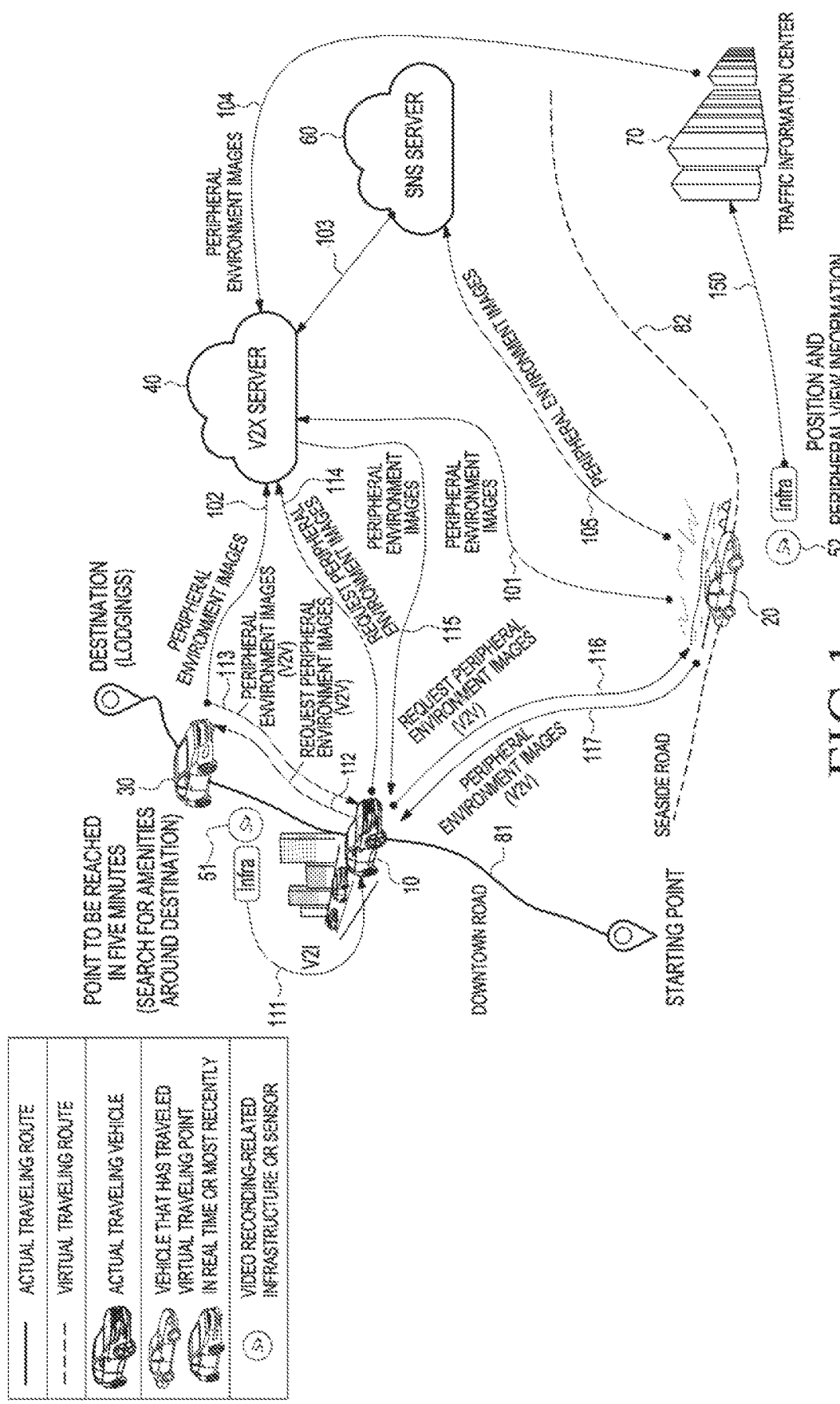
FIG. 1 is a diagram illustrating a system for displaying images by a vehicle according to various embodiments.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first," "a second," "the first," or "the second" may be used for corresponding components regardless of importance or order and are used to distinguish one component from another without limiting the components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for," "having the capacity to," "designed to," "adapted to," "made to," or "capable of" in terms of hardware or software, according to circumstances. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments may include at least one of a navigation device, a global navigation satellite system (GNSS), an event data recorder (EDR), a flight data recorder (FDR), at least a part of infotainment system of a transportation device (for example, a vehicle), electronic equipment for a ship (for example, a navigation device for a ship, a gyrocompass, or the like), avionics, or a vehicular head unit. Alternatively, the electronic device may include at least a part of a transportation device or an electronic board. Alternatively, the electronic device may be an advanced driver assistance system (ADAS) or a part of the ADAS. Alternatively, the electronic device 100 may be a control device, such as an electronic control unit (ECU), for electronically controlling various functions related to navigation of the transportation device and the like, or a part of the control device. In addition, when the electronic device is an external device mounted on the transportation device, the electronic device may be a driving assist device such as on-board diagnostics (OBD) connected to a vehicular connector (for example, an OBD terminal or an OBD connector), or a part thereof. In addition, the electronic device may include at least one of a smartphone, a tablet PC, a mobile phone, a video telephone, an electronic book reader, a laptop PC, a netbook computer, a portable multimedia player (PMP), or an MP3 player.

The electronic device of according to one or more embodiments in this document may collect vehicle-related information and provide the collected information to the user. In addition, the electronic device may perform various kinds of controls related to vehicle navigation. In addition, the electronic device may provide images to the display of the vehicle.

The electronic device may be configured in various types and connected to the vehicle operatively and/or electrically.

As used herein, "peripheral environment images" may refer to images of the peripheral environment (or scenery) of the vehicle. The vehicle's peripheral environment images may include still images or moving images of the environment seen in all directions (i.e. 360 degrees), including the forward direction of the vehicle, the backward direction thereof, the lateral direction thereof, and the upward direction thereof.

As used herein, "vehicle-related information" may include at least one of traveling route information regarding the route traveled by the vehicle, the vehicle's traveling state information, and the vehicle's environment information.

The traveling route information regarding the route traveled by the vehicle may include the vehicle's traveling route and section attribute information regarding the sections constituting the traveling route. The section attribute information may include at least one of a straight-traveling section, a left-turn section, a right-turn section, and a U-turn section. In addition, the section attribute information may include at least one of the angle of each section, the distance of the section, the width of the section, the number of lanes, and the type of the lanes (for example, highway or local surface streets).

As used herein, the vehicle's traveling state information may include, for example, at least one of the vehicle's location, the vehicle's traveling direction, the vehicle's traveling time period, and the vehicle's speed. The vehicle's environment information may include, for example, at least one of the weather at the vehicle's location, the degree of traffic congestion of the road along which the vehicle is traveling, sound (or noise) in the periphery of the vehicle, and the time at which the vehicle is traveling (for example, day/night).

As used herein, the user may include at least one of the vehicle driver, a fellow passenger, a vehicle occupant, and a person using an electronic device. In addition, the user may also include a device (for example, an artificial intelligence electronic device) using the disclosed electronic device.

FIG. 1 is a diagram illustrating a system for displaying images by a vehicle according to various embodiments.

The system of FIG. 1 may include at least one of a traveling vehicle 10 communicating with an electronic device 100 (shown in FIG. 2), second vehicles 20 and 30, which may be located at different locations, a vehicle-to-everything (V2X) server (for example, Samsung cloud server) 40, road infrastructures (for example, a CCTV, a speed enforcement camera, a parking sensor, a traffic light, and a traffic information collection sensor) 51 and 52, a social network service (SNS) server 60 (for example, a public cloud), and a traffic information center 70. In this situation, the vehicle 10 communicating with the electronic device 100 may be traveling along a first route or planned route 81, and the second vehicle 20 may be traveling along a second route 82.

In this case, the V2X server 40 may collect at least one of the various vehicles' peripheral environment images, traveling route information regarding the routes traveled by the vehicles, and the vehicles' traveling state information.

For example, the V2X server 40 may receive peripheral environment images (or route views) from the second vehicles 20 and 30 (as shown by numerals 101 and 102). Alternatively or additionally, the V2X server 40 may receive peripheral environment images from the SNS server 60 (as shown by numeral 103). The peripheral environment images from the SNS server 60 may show various aspects of the environment, such as the weather. For example, if the user of the second vehicle 20 takes images of the periphery of the second vehicle 20 and registers or stores the images in the SNS server 60 (as shown by numeral 105), the V2X server 40 may receive the image contents from the SNS server 60 as peripheral environment images. Alternatively or additionally, the V2X server 40 may receive peripheral environment images and traffic situation information (for example, traffic congestion and traffic light information) from the traffic information center 70 (as shown by numeral 104). The peripheral environment images may include images taken by the road infrastructures 51 and 52 and then transmitted to the traffic information center 70 (as shown by numeral 150). The V2X server 40 may store the collected information (for example, peripheral environment images, traveling route information, and traveling state information) in a database. Meanwhile, the V2X server 40 may update its map (for example, high definition (HD) map for supporting self-driving cars) related to the point of interest (POI) in real time to reflect the collected information.

According to an embodiment, in the system of FIG. 1, the vehicle 10 may be traveling toward the destination (for example, lodgings). In this case, the user of the vehicle 10 may want to check the peripheral environment of the planned route or the traffic situation. Alternatively, the user of the vehicle 10 may want to check peripheral information (for example, amenities) of a location along the planned route 81 between his current location and the destination. To this end, the vehicle 10 may acquire peripheral environment images of the road infrastructure 51 positioned along the planned route 81 between the vehicle's current location and the destination according to a vehicle-to-infrastructure (V2I) communication scheme (as shown by numeral 111). Alternatively or additionally, the vehicle 10 may request the second vehicle 30, which is traveling along a planned route, to provide images of the peripheral environment of the second vehicle 30 according to a vehicle-to-vehicle (V2V) communication scheme (as shown by numeral 112), and may acquire peripheral environment images from the second vehicle 30 in response thereto (as shown by numeral 113). Upon acquiring images of the peripheral environment seen in the forward direction (toward the destination), the vehicle 10 may display the acquired peripheral environment images through a display on the windshield by the vehicle 10. For example, the vehicle 10 may generate virtual peripheral environment images by converting and displaying the images of the peripheral environment seen in the forward direction. The vehicle 10 may display the generated virtual peripheral environment images through the display.

According to another embodiment, in the system of FIG. 1, the user of the vehicle 10 may want to check the peripheral environment of a different route or the traffic situation thereof. For example, when the planned route 81 is congested, the user may not be satisfied with the peripheral scenery. Accordingly, the user of the vehicle 10 may enter a user input that requests display of peripheral environment images of the second route 82, which is different from the currently-traveled planned route 81. In response to the user input, the electronic device 100 may request the V2X server 40 to provide peripheral environment images of the second route 802 (as shown by numeral 114), and may acquire peripheral environment images from the V2X server 40 in response thereto (as shown by numeral 115). Alternatively or additionally, the electronic device 100 may request the second vehicle 20 traveling along the second route 82 to provide peripheral environments images of the second route 82 (as shown by numeral 116), and may acquire the peripheral environment images from the second vehicle 20 in response thereto (as shown by numeral 117).

After acquiring peripheral environment images of the second route 82, the vehicle 10 may acquire at least one piece of vehicle-related information of the vehicle 10. The vehicle-related information of the vehicle 10 may include traveling route information regarding the route traveled by the vehicle 10, vehicle 10's traveling state information, and vehicle 10's environment information. The vehicle 10 may then convert the peripheral environment images of the second route 82 on the basis of the acquired vehicle-related information by using a conversion algorithm (or an editing algorithm or a matching algorithm). As the result of the conversion, the vehicle 10 may generate virtual surrounding environment images that reflect the traveling situation of the vehicle 10. The vehicle 10 may display the generated virtual peripheral environment images through the display (for example, a window).

The vehicle 10 may acquire a peripheral environment image (or a traveling image) of the second vehicle 20 from the V2X server 40 or the second vehicle 20, and may then convert the acquired image into a virtual peripheral environment image according to the traveling situation of the vehicle 10 through the conversion algorithm.

An exemplary description of the conversion algorithm is as follows:

The vehicle 10 may perform image conversion on the basis of the attribute of the acquired image or vehicle-related information corresponding to the acquired image (e.g. the speed of the traveling vehicle when the image was acquired).

For example, the conversion algorithm may be an algorithm that confers the attribute (e.g. frame rate or playback speed) of the acquired image. For example, if the acquired image is an image of 60 frames per sec captured when the second vehicle 20 was traveling at a speed of 100 km/h, and if the vehicle 10 is currently traveling at a speed of 50 km/h, the acquired image may be converted into an image of 30 frames per sec through the conversion algorithm, or may be reproduced twice slowly.

If images are displayed on the display (for example, a window) of the vehicle 10 according to the traveling situation (for example, speed) of the vehicle 10, the motion sickness of the user (occupant) of the vehicle 10 may be reduced, and the user's satisfaction may be increased.

The above-mentioned conversion algorithm is only an example, and various applications and modifications are possible.

According to various embodiments, the conversion algorithm may be stored in the V2X server 40. The V2X server 40 may acquire vehicle-related information from the vehicle 10 and may acquire peripheral environment images of the second route 82 from the second vehicle 20 traveling along the second route 82, the SNS server 60, or the traffic information center 70. The V2X server 40 may convert the peripheral environment images of the second route 82 by using the conversion algorithm so as to acquire virtual peripheral environment images that reflect the traveling situation of the vehicle 10. The V2X server 40 may transmit the virtual peripheral environment images to the vehicle 10. The vehicle 10 may display the received virtual peripheral environment images through the display (for example, a window).

According to various embodiments, the vehicle 10 may receive a user input specifying various parameters regarding the virtual peripheral environment images that are to be displayed. The user parameters may include, for example, the theme of the virtual peripheral environment (for example, clear weather or rainy weather), the time at which the images are taken (for example, the latest images, images corresponding to a specific season, or images corresponding to a specific time period), or the degree of traffic congestion (for example, a smooth traffic flow, a congested traffic flow, or absence of peripheral vehicles). The vehicle 10 or the V2X server may convert the peripheral environment images of the second route 82 or another route on the basis of the user parameters and the vehicle-related information of the vehicle 10. As a result of conversion, the vehicle 10 or the V2X server 40 may generate virtual peripheral environment images that reflect the traveling situation of the vehicle 10. The vehicle 10 may display the virtual peripheral environment images generated by the vehicle 10 or the V2X server 40 through the display (for example, a window).

Figure 2:
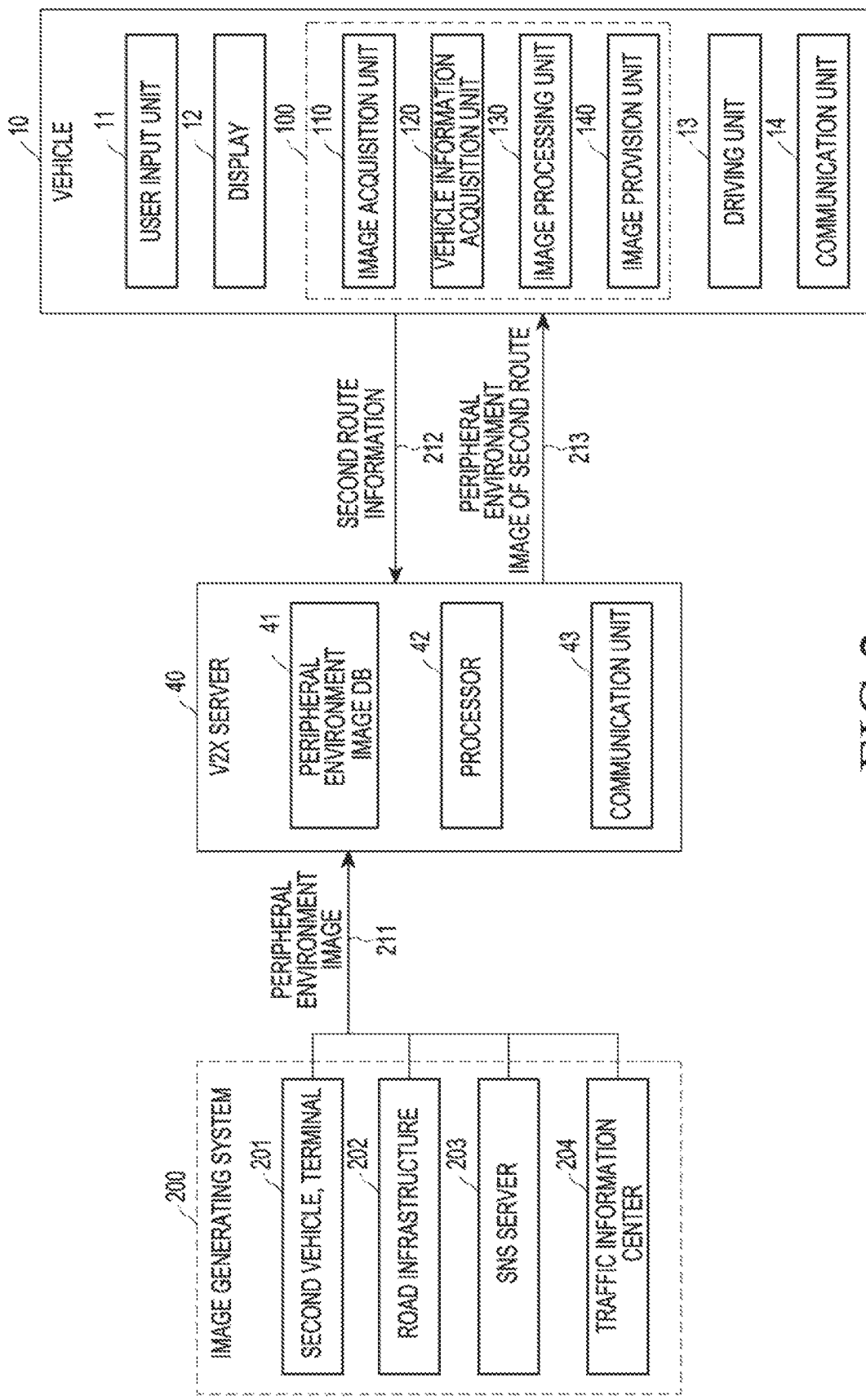
FIG. 2 is a block diagram illustrating a system according to various embodiments.

FIG. 2 is a block diagram illustrating a system according to various embodiments.

In FIG. 2, the system may include a vehicle 10, a V2X server 40, and an image generating system 200.

In FIG. 2, the processor 42 of the V2X server 40 may acquire the peripheral environment images of the second route described in connection with FIG. 1 from the image generating system 200 through the communication unit 43 (as shown by numeral 211), and may store the same in the peripheral environment image DB (or route view DB) 41. The image generating system 200 may include at least one device capable of acquiring peripheral environment images. For example, the image generating system 200 may include a second vehicle or a terminal (for example, a terminal of an occupant of the second vehicle) 201, a road infrastructure 202, an SNS server 203, and a traffic information center 204.

In this situation, the user of the vehicle 10 may input, through the user input unit 11 of the vehicle 10, an indication for the second route, which is different from the route currently being traveled by the vehicle 10. The image acquisition unit 110 of the electronic device 100, which communicates with the vehicle 10, may transmit second route information (i.e. the indication for the second route) to the V2X server 40 in response to the user's input (as shown by numeral 212). The processor 42 of the V2X server 40 may retrieve peripheral environment images of the second route from the peripheral environment image DB 41 on the basis of the received second route information. In addition, the V2X server 40 may transmit the retrieved peripheral environment images of the second route to the vehicle 10 through the communication unit 43 (as shown by numeral 213).

The image acquisition unit 110 of the electronic device 100 may acquire the peripheral environment images of the second route through the communication unit 14 of the vehicle 10. In addition, the vehicle information acquisition unit 120 of the electronic device 100 may acquire at least one piece of vehicle-related information of the vehicle 10, such as the vehicle's traveling route information, the vehicle's traveling state information, and/or the vehicle's environment information. The vehicle's traveling state information may be acquired, for example, from the driving unit 13 that controls the traveling state of the vehicle 10. The image processing unit 130 of the electronic device 100 may convert (or edit) the peripheral environment images of the second route acquired through the image acquisition unit 110 on the basis of the vehicle-related information acquired through the vehicle information acquisition unit 120. The conversion algorithm described above may be applied for image conversion. As the result of the conversion, the image processing unit 130 may generate virtual peripheral environment images that reflect the traveling situation of the vehicle 10. In addition, the image processing unit 130 may process the virtual peripheral environment images in a format appropriate for image playback by the vehicle 10. The image provision unit 140 of the electronic device 100 may provide the display 12 with the virtual peripheral environment images generated by the image processing unit 130.

The display 12 of the vehicle 10 may display the virtual peripheral environment images provided from the image processing unit 130.

According to various embodiments, the processor 42 of the V2X server 40 may convert (or edit) the peripheral environment images of the second route acquired from the peripheral environment image DB 41 such that the traveling situation of the vehicle 10 is considered. In addition, the processor 42 of the V2X server 40 may transmit the virtual peripheral environment images to the vehicle 10 through the communication unit 43. In this case, the electronic device 100 communicating with the vehicle 10 may control the display 12 so as to display the virtual peripheral environment images received from the V2X server 40.

According to various embodiments, the image acquisition unit 110 of the electronic device 100 communicating with the vehicle 10 may acquire peripheral environment images of the second route through the communication unit 14 in response to the user requesting the second route via a user input. The vehicle information acquisition unit 120 may acquire at least one piece of vehicle-related information of the vehicle 10, such as traveling route information regarding the route currently traveled by the vehicle 10, traveling state information of the vehicle 10, and environment information of the vehicle 10. The image processing unit 130 may convert the peripheral environment images of the second route acquired through the image acquisition unit 110 on the basis of the vehicle-related information acquired through the vehicle information acquisition unit 120, thereby generating virtual peripheral environment images that reflect the vehicle's traveling situation. The image provision unit 140 may provide the generated virtual peripheral environment images to the vehicle 10.

In this case, the image acquisition unit 110 may control the communication unit 14 so as to transmit a request for second route information to the V2X server 40 in response to the user input and may acquire peripheral environment images of the second route from the V2X server through the communication unit 14.

When conditions or parameters regarding the virtual peripheral environment images are acquired from the user through the user input unit 11, the image processing unit 130 may convert the acquired peripheral environment images of the second route based on the acquired vehicle-related information and the user conditions, thereby generating virtual peripheral environment images that reflect the traveling situation of the vehicle 10.

The image acquisition unit 110 may acquire peripheral environment images at a specific location due to user request. The image provision unit 140 may provide the acquired peripheral environment images at the specific location to the display 12 provided in the vehicle 10.

When there are no sub peripheral environment images corresponding to a specific section of the second route, the image processing unit 130 may modify at least one sub peripheral environment image corresponding to a section adjacent to the specific section, thereby generating a sub peripheral environment image corresponding to the specific section.

In addition, the vehicle 10 may control the driving unit 13 such that the vehicle 10 self-drives along the second route in response to a user input that is made through the user input unit 11 to select the second route as the actual traveling route. For example, once the second route is selected, the vehicle 10 may self-drive to the starting point of the second route and begin self-driving along the route.

According to various embodiments, the electronic device 100 communicating with the vehicle 10 may include a processor (not illustrated) and a memory (or a storage unit). The processor may include, for example, at least one of the image acquisition unit 110, the vehicle information acquisition unit 120, the image processing unit 130, and the image provision unit 140. The memory may include at least a part of the storage unit 16 of the vehicle 10 (shown in FIG. 20). In this case, the electronic device 100 may include a processor and a memory for storing at least one instruction for communicating with the processor. The at least one instruction may be configured to cause the processor, when executed, to acquire peripheral environment images of a second route on the basis of a user input, where the second route is different from the route along which the vehicle 10 is traveling; to acquire at least one piece of vehicle-related information selected from traveling route information regarding the route of traveling of the vehicle 10, traveling state information of the vehicle 10, and environment information of the vehicle 10; to convert the acquired peripheral environment images of the second route on the basis of the acquired vehicle-related information, thereby generating virtual peripheral environment images that reflect the traveling situation of the vehicle 10; and to provide the generated virtual peripheral environment images to the vehicle 10.

Figure 3A:
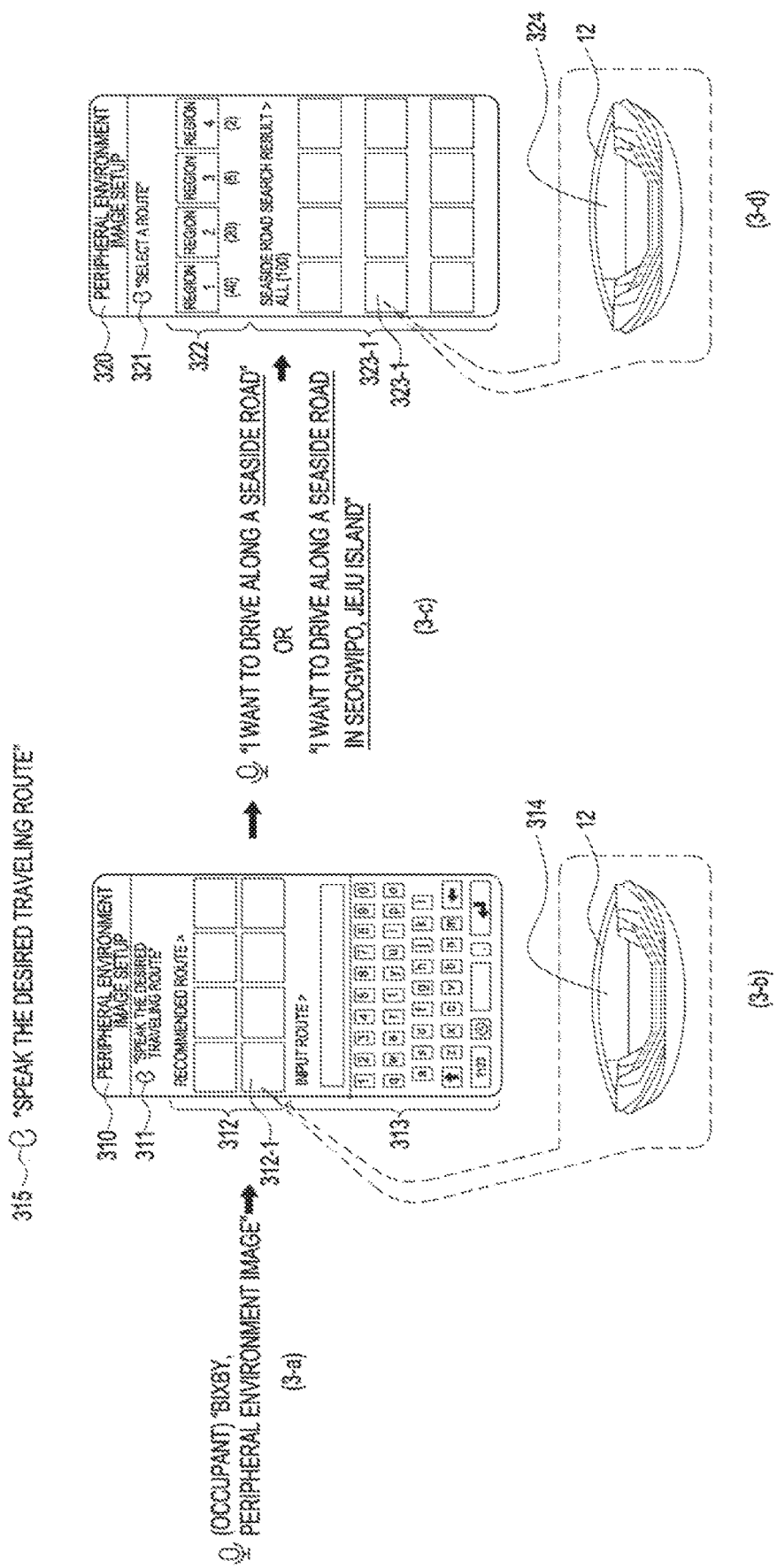
FIG. 3A is a diagram illustrating a user interface (UI) for displaying peripheral environment images according to various embodiments.
Figure 3B:
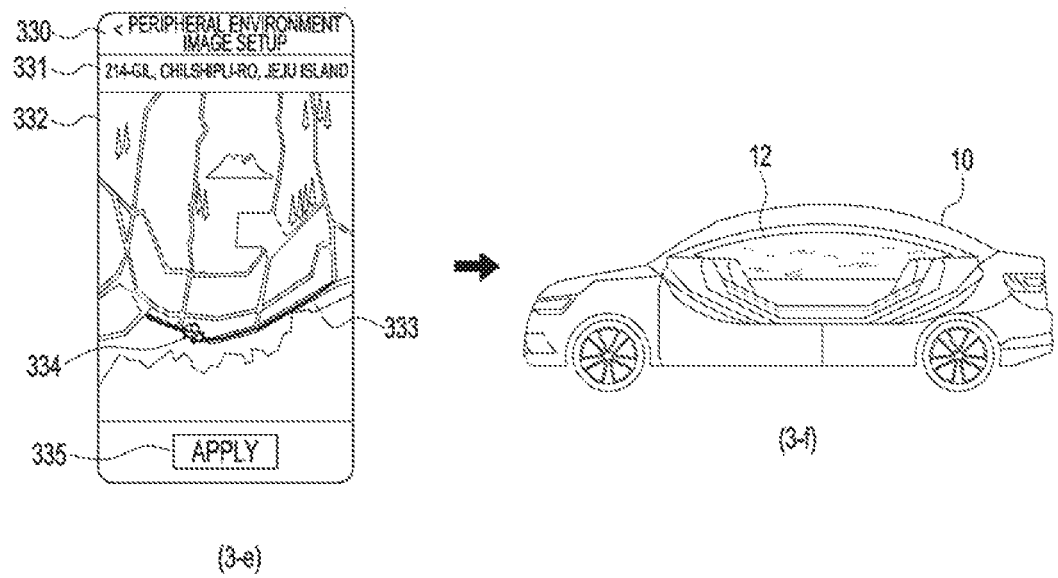
FIG. 3B is a diagram illustrating a UI for displaying peripheral environment images according to various embodiments.

FIG. 3A is a diagram illustrating a user interface (UI) for displaying peripheral environment images according to various embodiments. FIG. 3B is a diagram illustrating a UI for displaying peripheral environment images according to various embodiments.

In FIG. 3A and FIG. 3B, a screen for execution of a route setup application for displaying virtual peripheral environment images may be displayed through the display 12 provided in the vehicle 10. Alternatively, the route setup application execution screen may be displayed through the display of the electronic device 100 or a terminal (not illustrated) held by the user of the vehicle 10. A UI for manipulating the route setup application may be also displayed on the display provided in the vehicle so the UI can be touched or pressed. Alternatively, the UI may be provided as physical buttons separated disposed from the display (for example, buttons on the dashboard, buttons on the steering wheel, buttons along the periphery of the user's seat, or a remote control unit).

The display for displaying the route setup application execution screen and the display for displaying virtual peripheral environment images may be identical to or different from each other. For example, the display for displaying the route setup application execution screen may be a head-up display, a display on the dashboard, or a display on the rear surface of a seat, and the display for displaying virtual peripheral environment images may be a window or windshield. Alternatively, the display for displaying the route setup application execution screen may be the display of the electronic device 100, and the display for displaying virtual peripheral environment images may be a window of the vehicle 10. Alternatively, when the display for displaying the route setup application execution screen and the display for displaying virtual peripheral environment images are identical, the route setup application execution screen may be displayed so as to overlap with the virtual peripheral environment images.

In (3-a) of FIG. 3A, the user of the vehicle 10 may request execution of a route setup application (for example, a route view setup application) that enables selection of the second route. For example, if the user utters a voice command "Bixby, peripheral environment images (or route view)," the vehicle 10 or the electronic device 100 may receive a user input resulting from the user's utterance.

Based on the user input, the vehicle 10 or the electronic device 100 may display a first screen 310, through which the second route may be selected, as illustrated in (3-b) of FIG. 3A. The first screen 310 may include at least one of a message 311 requesting input of the second route desired by the user, a recommended route thumbnail list 312, and a route input UI 313 through which the second route can be manually entered. In this case, the vehicle 10 may output a voice requesting input of the second route desired by the user. For example, the vehicle 10 may output a voice 315 "Speak a desired traveling route." According to various embodiments, if a thumbnail 312-1 is selected from the recommended route thumbnail list 312, the vehicle 10 may display a preview image 314 of the recommended route corresponding to the selected thumbnail 312-1 through the display 12.

The preview image may be a still image or a moving image, and may be a prestored image of the recommended route or a real-time image of the recommended route. The preview image may be displayed through the same display as the display for displaying the route setup application execution screen, or may be displayed through a different display. For example, the route setup application execution screen may be displayed through the display on the rear surface of a seat, and the preview image may be displayed through a display (for example, a window) on a side surface of the vehicle.

In (3-c) of FIG. 3A, the user may utter a voice command indicating the second route, in lieu of selecting the thumbnail 312-1. For example, the user may say "I want to drive along a seaside road" or "I want to drive along a seaside road in Seogwipo, Jeju Island". Alternatively, the user may enter the desired second route by using the keypad of the route input UI 313.

On the basis of the user's input, the vehicle 10 or the electronic device 100 may display a second screen 320 through which a more specific second route can be input, as in (3-d) of FIG. 3A. The second screen 320 may include at least one of a message 321 requesting input of the specific second route desired by the user, a region list 322 corresponding to the second route, and a thumbnail list 323 of the second route. According to an embodiment, if a thumbnail 323-1 is selected from the thumbnail list 323 of the second route, the vehicle 10 may display a preview image 324 of the second route corresponding to the selected thumbnail 323-1 through the display.

In addition, on the basis of the user input of selecting a thumbnail 323-1, the vehicle 10 or the electronic device 100 may display a third screen 330 showing the second route as in (3-e) of FIG. 3B. The third screen 330 may include at least one of an approximate address 331 of the second route, a map image 332 including the second route, the second route 333, and a vehicle indicator 334 on the second route 333, indicating the point of view of the peripheral environment images.

If the user selects the apply button 335 in (3-e) of FIG. 3B, the vehicle 10 may acquire peripheral environment images of the second route 333 and vehicle-related information of the vehicle 10. Alternatively, if the electronic device 100 transmits a command to the vehicle 10 so as to request acquisition of peripheral environment images of the second route 333 in response to the user's selection of the apply button 335, the vehicle 10 may acquire peripheral environment images of the second route 333 and vehicle-related information of the vehicle 10.

After acquiring the peripheral environment images and vehicle-related information, the vehicle 10 may convert the peripheral environment images of the second route on the basis of the vehicle-related information, thereby generating virtual peripheral environment images. In addition, the vehicle 10 may display the virtual peripheral environment images through the display 12 as in (3-f) in FIG. 3B. The virtual peripheral environment images may include images of the peripheral environment of the second route, corresponding to the traveling direction of the vehicle 10, from the location of the indicator 334 on the second route.

Figure 4:
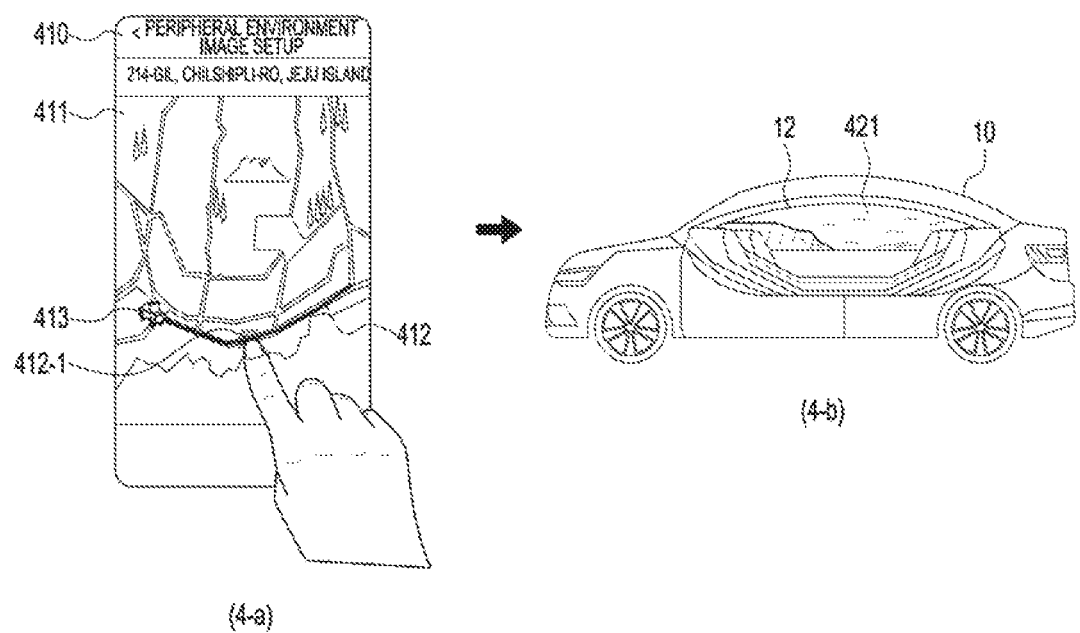
FIG. 4 is a diagram illustrating a UI for displaying peripheral environment images according to various embodiments.

FIG. 4 is a diagram illustrating a UI for displaying peripheral environment images according to various embodiments.

In (4-a) of FIG. 4, the vehicle 10 or the electronic device 100 may display a screen 410 including the second route. On the screen 410, a map image 411 including the second route, the second route 412, and a vehicle indicator 413 on the second route may be displayed.

In this situation, the user may select a specific location 412-1 on the second route 412. For example, the user may touch a specific location 412-1 on the second route 412 using his finger, or may drag the vehicle indicator 413 and move the same to the specific location 412-1 on the second route 412. Upon receiving this input, the vehicle 10 may acquire peripheral environment images at the specific location 412-1. In addition, the vehicle 10 may display the acquired peripheral environment images 421 through the display 12 as in (4-b) of FIG. 4. As another example, upon acquiring peripheral environment images, the vehicle 10 may convert the acquired peripheral environment images on the basis of vehicle-related information, thereby generating virtual peripheral environment images. The vehicle 10 may display the virtual peripheral environment images 421 through the display 12.

Figure 5:
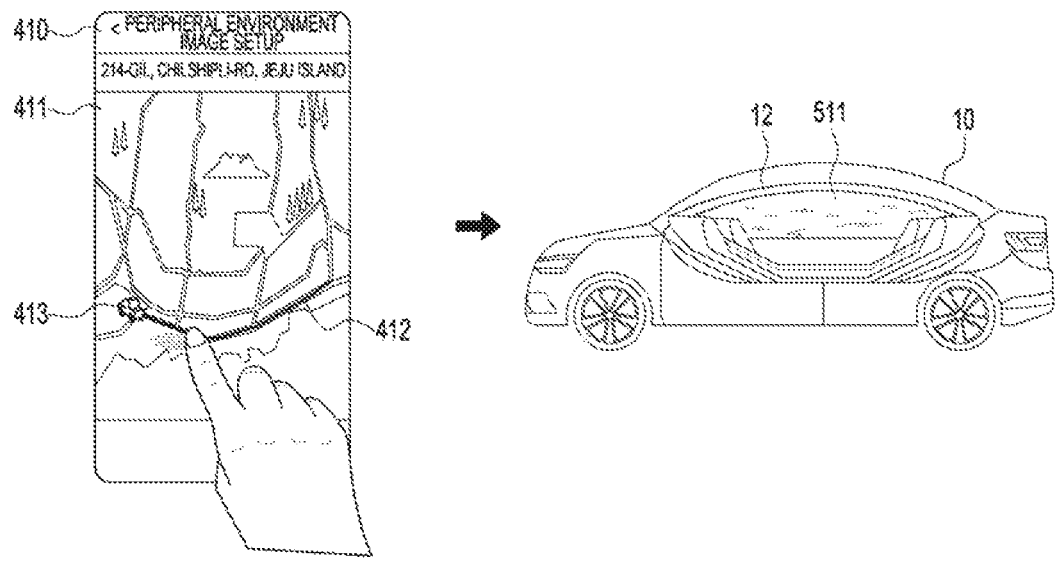
FIG. 5 is a diagram illustrating a UI for displaying peripheral environment images according to various embodiments.
Figure 5:
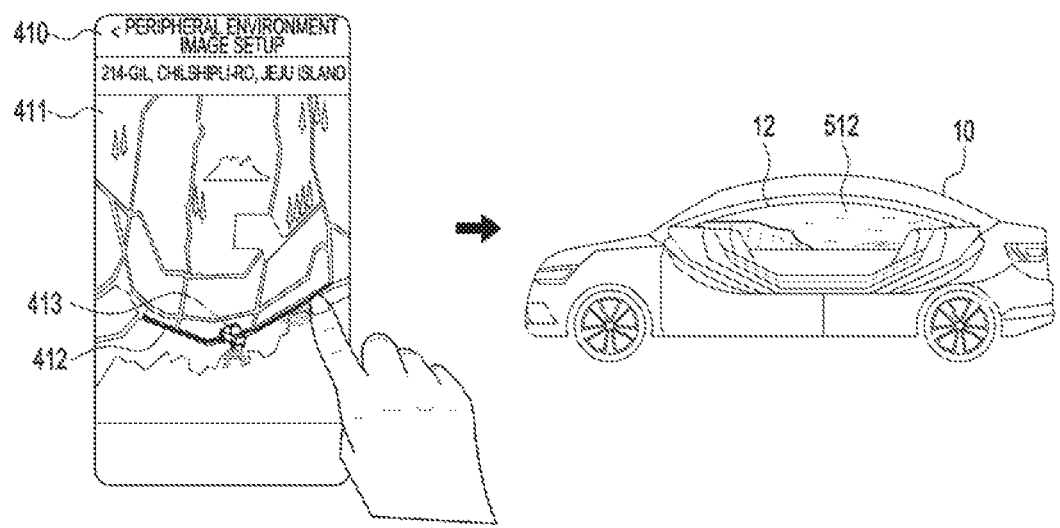

FIG. 5 is a diagram illustrating a UI for displaying peripheral environment images according to various embodiments.

The screen 410 in (5-a) and (5-b) of FIG. 5 may correspond to the above-described screen 410 of FIG. 4.

In (5-a) of FIG. 5 and (5-b) of FIG. 5, the user may perform a drag in a direction on the screen 410. For example, the direction corresponds to the forward movement direction of the vehicle (10). Alternatively, the user may drag the vehicle indicator 413 in a direction. As a result, the vehicle indicator 413 may be moved along the second route 412.

The vehicle 10 may successively display peripheral environment images 511 and 512 corresponding to the locations of the vehicle indicator 413 on the second route 412 according to the user's input.

The user may perform a drag gesture on the screen 410 in the forward or backward direction of the vehicle, or may drag the vehicle indicator 413 to the front or rear of the second route. In this case, the rate at which the peripheral environment images 512 and 512 are displayed may change in proportion to the rate of the drag. For example, when the vehicle 10 has acquired a peripheral environment image of the second route as a moving image, the vehicle may perform rewinding and fast-forwarding of the moving image in proportion to the rate of drag. Through a change in the peripheral environment image as a result of the simulated traveling of the vehicle, the user may feel a virtual experience according to the change in the traveling speed of the vehicle.

Figure 6A:
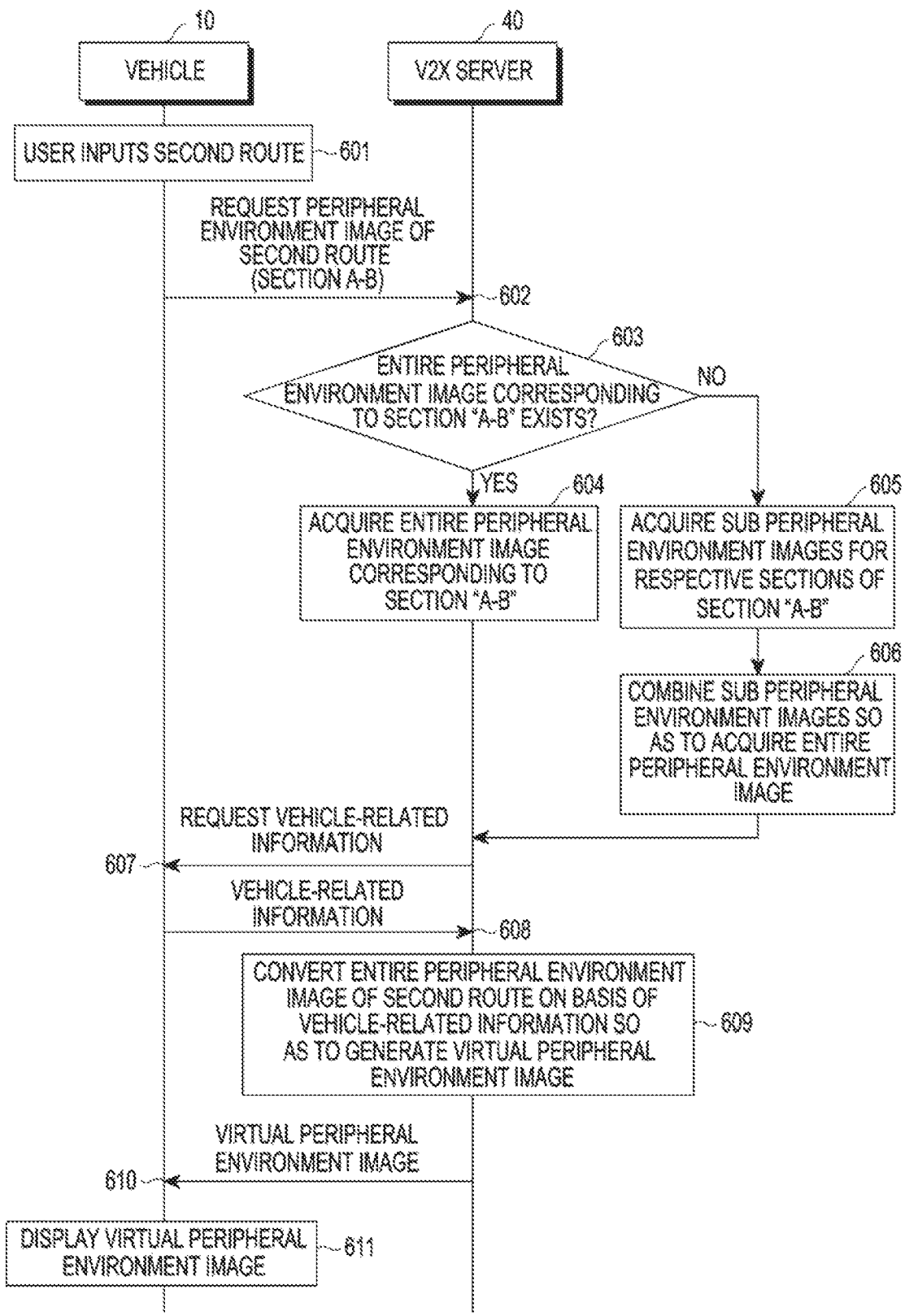
FIG. 6A is a flowchart for acquiring and displaying peripheral environment images according to various embodiments.
Figure 6B:
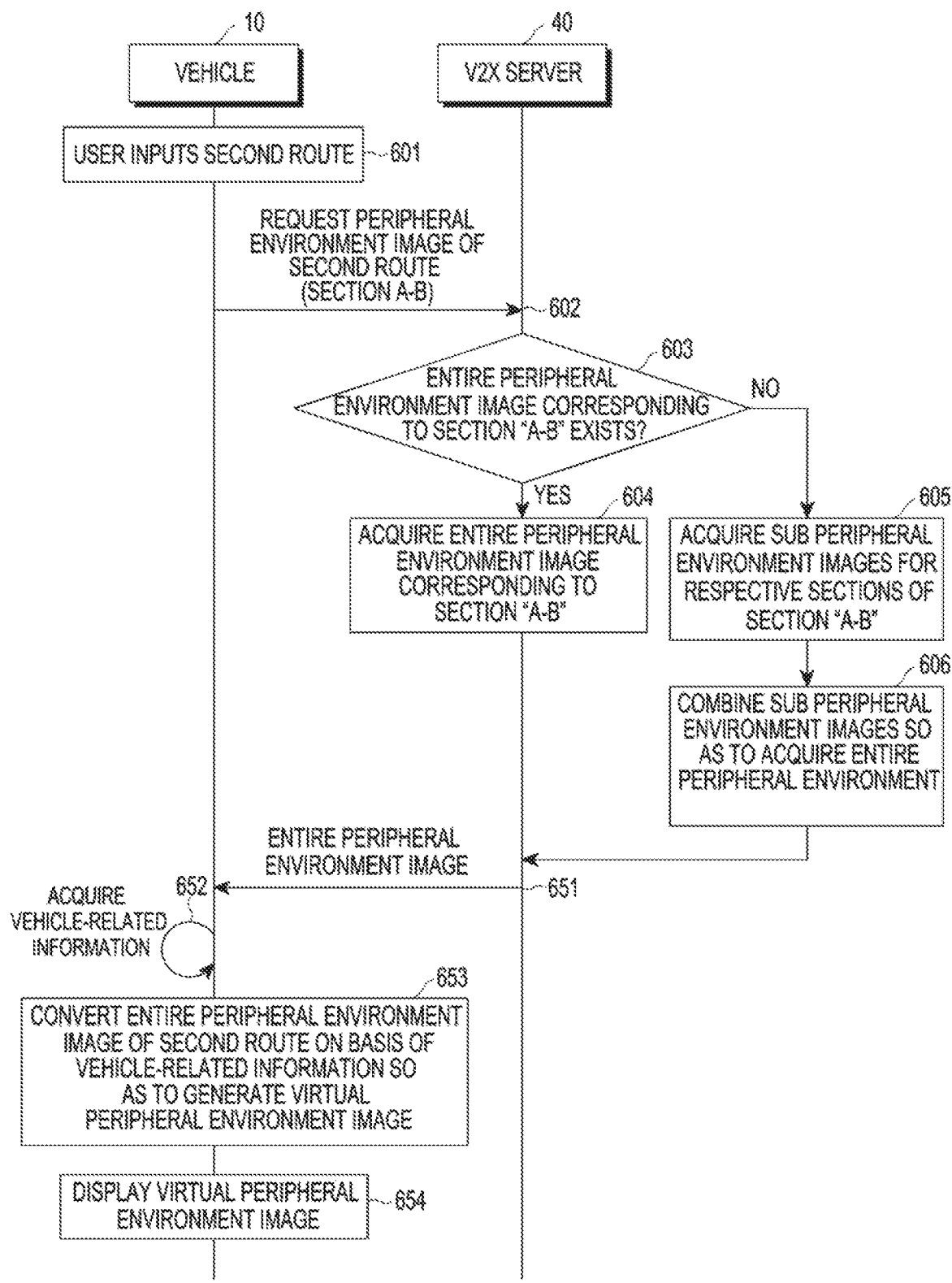
FIG. 6B is a flowchart for acquiring and displaying peripheral environment images according to various embodiments.

FIG. 6A is a flowchart for acquiring and displaying peripheral environment images according to various embodiments. FIG. 6B is a flowchart for acquiring and displaying peripheral environment images according to various embodiments.

The system of FIG. 6A may include a vehicle 10 and a V2X server 40.

Initially, a user riding in the vehicle 10 may input or selected a second route (601). On the basis of the user's input, the vehicle 10 may request the V2X server (for example, a Samsung cloud server) to provide a peripheral environment image of the second route (602). In this case, the vehicle 10 may transmit route information regarding the second route (i.e. a selection of the second route), inputted by the user, to the V2X server 40.

The second route may be, for example, a route section from location A to location B (hereinafter, referred to as section A-B).

The V2X server 40 may determine whether the entire peripheral environment image corresponding to "section A-B" exists (603).

When the entire peripheral environment image corresponding to "section A-B" exists (Yes in 603), the V2X server 40 may acquire the entire peripheral environment image corresponding to "section A-B" (604).

In contrast, when the entire peripheral environment image corresponding to "section A-B" does not exist (No in 603), the V2X server 40 may acquire sub peripheral environment images with regard to respective sections of "section A-B" (605). In addition, the V2X server may generate the entire peripheral environment image corresponding to "section A-B" by combining (or remapping) the sub peripheral environment images (606).

Figure 7:
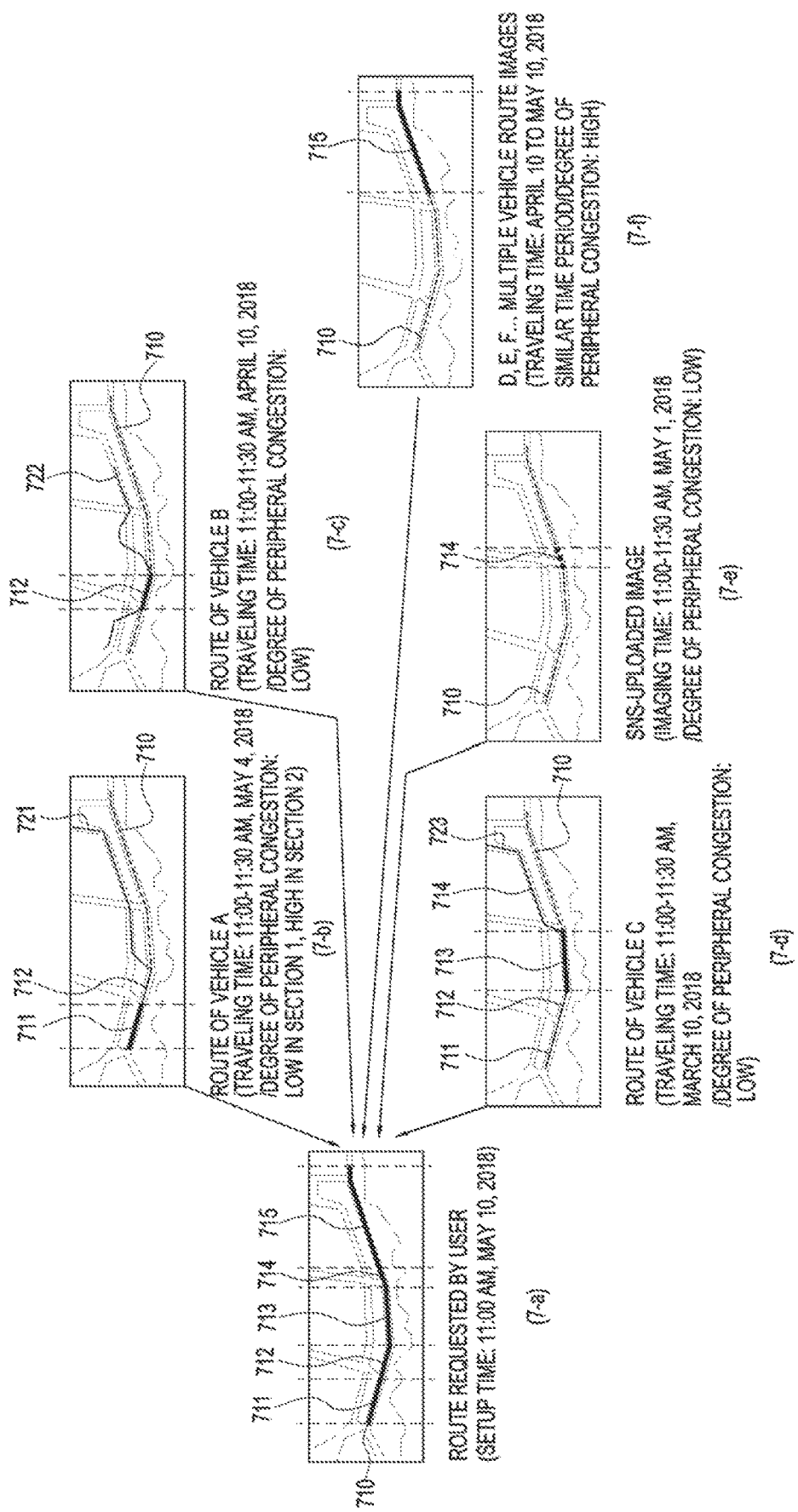
FIG. 7 is a diagram illustrating the generation of peripheral environment images of a second route according to various embodiments.

For example, the V2X server may generate the entire peripheral environment image from section-specific images in a manner as illustrated in FIG. 7.

In FIG. 7, (7-a) may correspond to a second route 710 requiring a peripheral environment image. In this case, the V2X server 40 may acquire a peripheral environment image in view of priority set by the user or the vehicle 10. For example, the V2X server 40 may preferentially acquire peripheral environment images of the second route with a low degree of traffic congestion, or may preferentially acquire peripheral environment images that are most recent (for example, within a month). The V2X server 40 may select the section-specific peripheral environment images of (7-b) to (7-f) of FIG. 7 (as described below), thereby generating the entire peripheral environment image corresponding to the entire second route 710 of (7-a) of FIG. 7.

Firstly, (7-b) of FIG. 7 illustrates a situation in which the peripheral environment image of the first section 711 of the second route 710 is acquired. In (7-b) of FIG. 7, vehicle A may be the latest vehicle to travel this part of the second route 710. The traveling route 721 of vehicle A may include the first section 711 and the second section 712 of the second route 710. In this case, the degree of traffic congestion of the first section 711 of vehicle A may be low, and the degree of traffic congestion of the second section 712 may be high. In this case, the V2X server may select the peripheral environment image in the first section 711, which has a low degree of traffic congestion, of the traveling route 721 of vehicle A as a part 711 of the peripheral environment image of the second route 710.

In FIG. 7, (7-c) corresponds to a situation in which the peripheral environment image of the second section 712 of the second route 710 is acquired. In (7-c) of FIG. 7, vehicle B may be a vehicle traveling behind vehicle A, and the degree of traffic congestion of the second section 712 of vehicle B may be lower than the degree of traffic congestion of the second section 712 of vehicle A. In other words, by the time vehicle B traverses the second section 712, congestion may have abated. In this case, the V2X server 40 may select the peripheral environment image in the second section 712 of the traveling route 722 of vehicle B as a part 712 of the peripheral environment image of the second route 710.

In FIG. 7, (7-d) corresponds to a situation in which the peripheral environment image of the third section 713 of the second route 710 is acquired. In (7-d) of FIG. 7, the degree of traffic congestion of all vehicles that have traveled the third section 713 within a predetermined period of time (for example, within one month) may be equal to or higher than a threshold value. In this case, the V2X server 40 may select vehicle C, which is the latest vehicle to travel through third section 713 when the degree of traffic congestion is equal to or lower than the threshold value, even though vehicle C traveled at a time that is outside the predetermined period of time (i.e. more than a month ago). The V2X server 40 may select the peripheral environment image in the third section 713 of the traveling route 723 of vehicle C as a part 713 of the peripheral environment image of the second route 710.

In FIG. 7, (7-e) corresponds to a situation in which the peripheral environment image of the fourth section 714 of the second route 710 is acquired. In (7-e) of FIG. 7, the V2X server 40 may have difficulty in acquiring peripheral environment images of vehicles that have traveled the fourth section 714. For example, no peripheral environment images of vehicles that have traveled the fourth section 714 may be retrieved from the database, or there may be no vehicles that have traveled the fourth section 714 within a predetermined period of time (for example, within one year). In this case, the V2X server 40 may retrieve the peripheral environment image of the fourth section 714 from the SNS server 60. That is, the V2X server 40 may select the peripheral environment image of the fourth section 714 from still images or moving images uploaded to the SNS server 60 as a part 714 of the peripheral environment image of the second route 710.

In FIG. 7, (7-f) corresponds to a situation in which the peripheral environment image of the fifth section 715 of the second route 710 is acquired. In (7-f) of FIG. 7, the peripheral environment images of the fifth section 715 acquired by the V2X server 40 may all be images where there is a high degree of traffic congestion. In this case, the V2X server 40 may synthesize peripheral environment images of multiple vehicles that have traveled the fifth section 715 within a predetermined period of time, to generate a peripheral environment image having a low degree of traffic congestion. For example, the V2X server 40 may model the peripheral environment image using a virtual vehicle traveling through the fifth section 715 at a constant speed and may selectively synthesize peripheral environment images corresponding to the constant speed. In addition, cars in the images along the route that are part of the congestion may be removed from the images using known techniques, such as the image stacking technique. This way, a peripheral environment image having a low degree of traffic congestion may be generated. In addition, the V2X server 40 may select the generated peripheral environment image as a part 715 of the peripheral environment image of the second route 710.

After generating the entire peripheral environment image (hereinafter, referred to as the peripheral environment image of the second route) through the above-described process of FIG. 7, referring back to FIG. 6A, the V2X server 40 may request the vehicle 10 to provide vehicle-related information of the vehicle 10 (607), and may acquire vehicle-related information in response thereto (608). According to various embodiments, the vehicle-related information may be initially acquired from the vehicle 10 before determining whether or not there exists the entire peripheral environment image corresponding to "section A-B." That is, steps 607-608 may be performed before step 603. Alternatively, the vehicle-related information may be acquired from the vehicle 10 while the V2X server 40 generates the entire peripheral environment image from sub peripheral environment images.

Using the acquired vehicle-related information, the V2X server 40 may convert the entire peripheral environment image of the second route, thereby generating a virtual peripheral environment image. For example, the peripheral environment image may be converted by using at least one of the vehicle-related information of the vehicle 10 and the vehicle-related information of a vehicle on the second route. The V2X server 40 may generate various types of virtual peripheral environment images. For example, the V2X server 40 may generate a peripheral environment image for daytime and a peripheral environment image for nighttime. Alternatively or additionally, the V2X server 40 may generate a peripheral environment image for speed A and a peripheral environment image for speed B. Alternatively or additionally, the V2X server 40 may generate a peripheral environment image of weather A (for example, clear weather) and a peripheral environment image for weather B (for example, rainy weather).

The V2X server 40 may transmit at least one generated virtual peripheral environment image to the vehicle 10 (610). When the V2X server 40 has generated multiple virtual peripheral environment images, the V2X server 40 may transmit the multiple virtual peripheral environment images to the vehicle 10 or transmit some of the multiple virtual peripheral environment images to the vehicle 10 in view of the traveling state of the vehicle 10 or the vehicle's environment information. According to various embodiments, among the multiple virtual peripheral environment images, at least one virtual peripheral environment image conforming to a user-selected condition or the traveling condition of the vehicle 10 may be selectively transmitted to the vehicle 10. In this case, the V2X server 40 may have received information regarding the condition in advance. After receiving at least one virtual peripheral environment image, the vehicle 10 may display the virtual peripheral environment image through the display 12 (611).

FIG. 6B is a flowchart for acquiring and displaying peripheral environment images according to various embodiments.

In FIG. 6B, operations 601 to 606 correspond to the above-described operations 601 to 606 in FIG. 6A, and repeated descriptions thereof will be omitted herein.

In operations 601 to 606 in FIG. 6B, when the entire peripheral environment image is generated, the V2X server 40 may transmit the entire peripheral environment image to the vehicle 10 (651).

After receiving the entire peripheral environment image, the vehicle 10 may acquire vehicle-related information (652). According to various embodiments, the vehicle 10 may have acquired the vehicle-related information in advance.

On the basis of the acquired vehicle-related information, the vehicle 10 may convert the entire peripheral environment image of the second route, thereby generating a virtual peripheral environment image (653). The vehicle 10 may also generate various types of virtual peripheral environment images as in the case of the V2X server 40 described above with reference to FIG. 6A.

The vehicle 10 may display the generated virtual peripheral environment image through the display 12 (654). According to various embodiments, when multiple virtual peripheral environment images have been generated, the vehicle 10 may display a virtual peripheral environment image conforming to a user-selected condition, the traveling condition of the vehicle 10, or a preset condition through the display 12.

Figure 8:
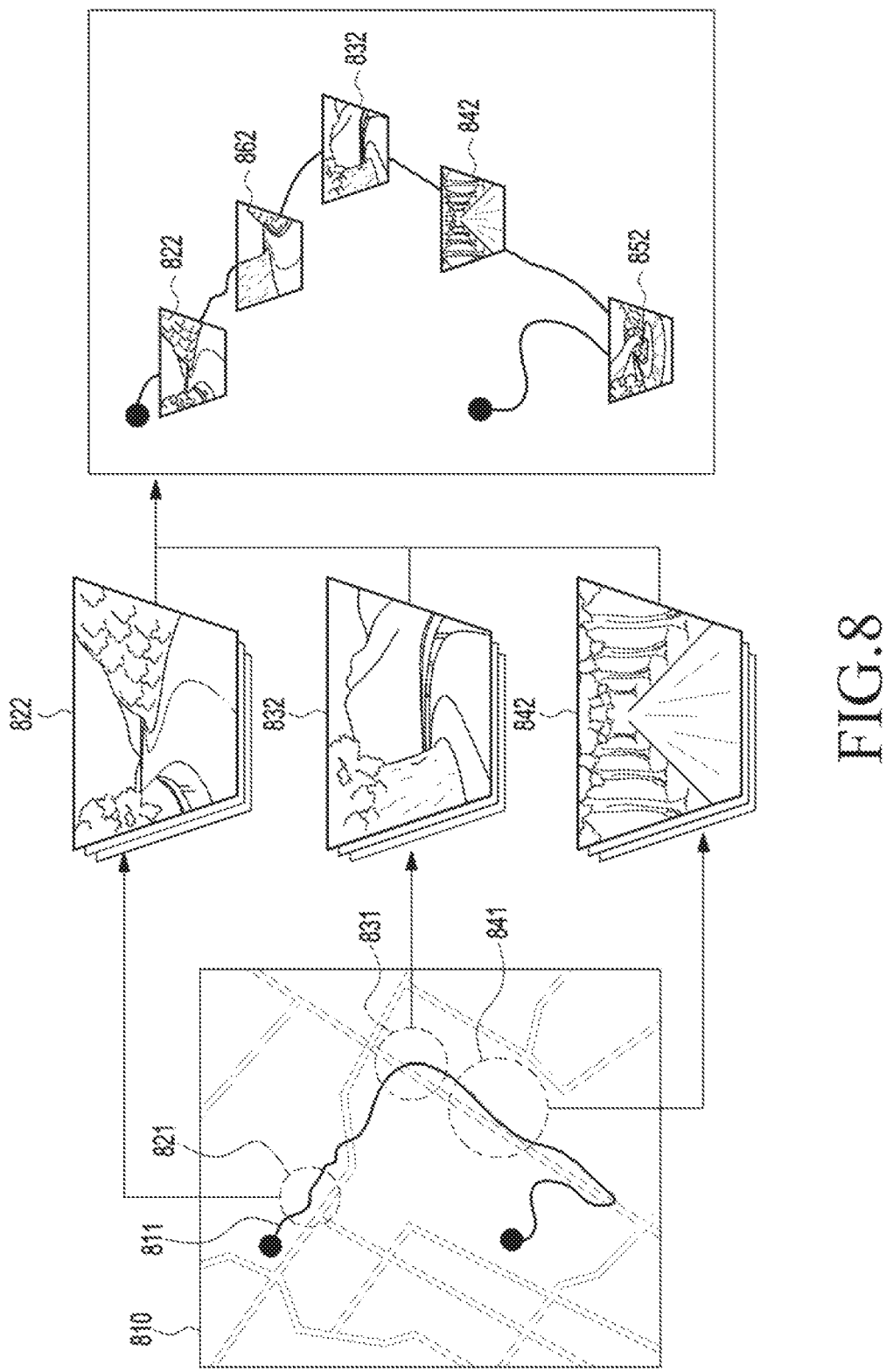
FIG. 8 is a diagram illustrating generation of virtual peripheral environment images according to various embodiments.

FIG. 8 is a diagram illustrating generation of virtual peripheral environment images according to various embodiments.

In FIG. 8, reference numeral 810 denotes a map 810 including a scheduled traveling route 811 along which the vehicle 10 is scheduled to travel. In FIG. 8, peripheral environment images may be selected so as to correspond to the scheduled traveling route 811 of the vehicle 10.

For example, the scheduled traveling route may include a first section (for example, a zigzag section) 821. In this case, the V2X server 40 may select (or collect) a sub peripheral environment image 822 corresponding to (or matching) the first section 821 from stored peripheral environment images based on attributes of the first section 821 (for example, the angle of each section, the distance of the section, the width of the section, the number of lanes, or the type of lanes). Similarly, the V2X server 40 may select a sub peripheral environment image 832 corresponding to the second section 831 from stored peripheral environment images based on the attribute of the second section 831 (for example, the second section including a right-turn). In addition, the V2X server 40 may select a sub peripheral environment image 842 corresponding to the third section 841 from stored peripheral environment images based on the attribute of the third section 841 (for example, the third section including a straight section).

Thus, multiple sub peripheral environment images may be selected for each section. In this case, the V2X server 40 or the vehicle 10 may select a sub peripheral environment image conforming to a user condition. For example, in view of certain theme information selected by the user (e.g. daytime), the V2X server 40 or the vehicle 10 may select a sub peripheral environment image conforming to the theme information. After selecting sub peripheral environment images, the V2X server 40 or the vehicle 10 may combine (or stitch) the selected sub peripheral environment image 822, 832, 834, 852, and 862 for the respective sections, thereby generating a virtual peripheral environment image. Meanwhile, there may be no sub peripheral environment image corresponding to a specific section. In this case, the V2X server or the vehicle 10 may modify (for example, modify by using a known morphing technique) at least one sub peripheral environment image corresponding to a section adjacent to the specific section, and generate sub peripheral environment images corresponding to the specific section.

After generating a virtual peripheral environment image corresponding to the entire second route by combining the sub peripheral environment images, the vehicle 10 may display the generated virtual peripheral environment image through the display 12.

Figure 9:
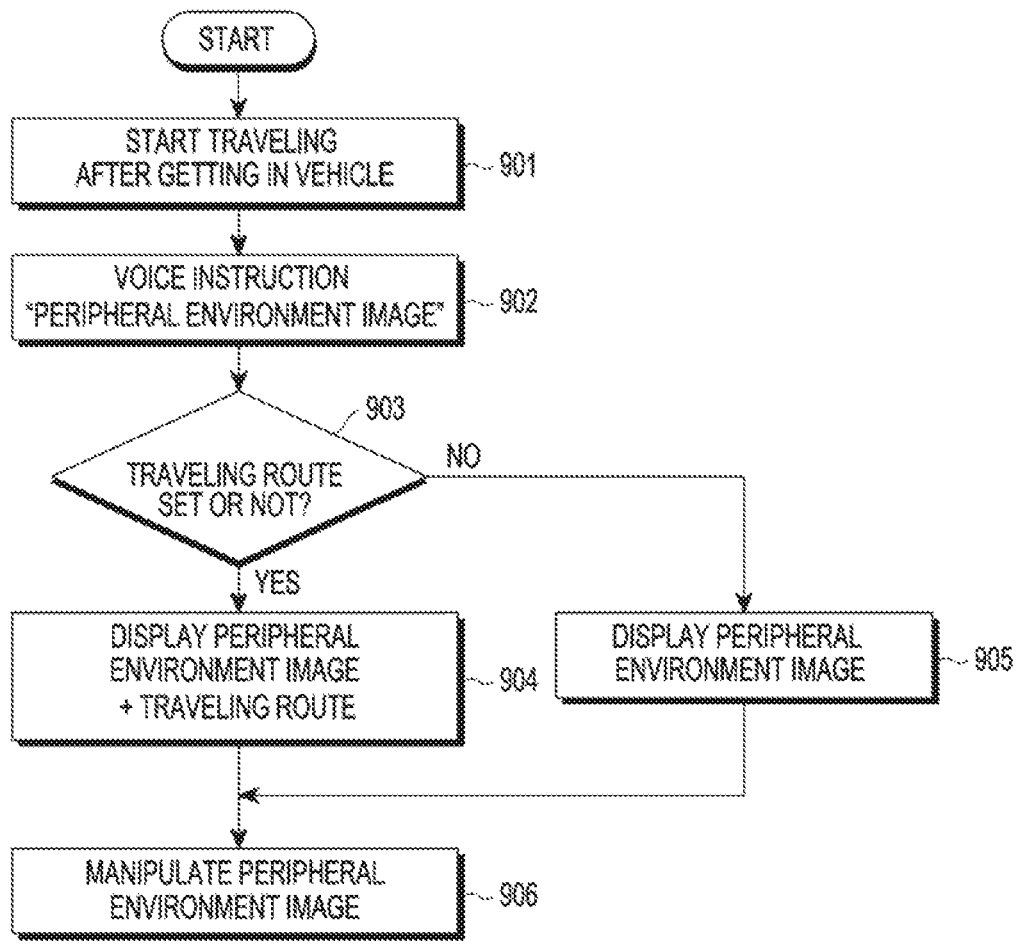
FIG. 9 is a flowchart illustrating a process of displaying and manipulating peripheral environment images according to various embodiments.

FIG. 9 is a flowchart illustrating a process of displaying and manipulating peripheral environment images according to various embodiments.

In FIG. 9, when the user gets in the vehicle 10, the vehicle 10 may start traveling (901). In this case, if the vehicle is in self-driving mode, the vehicle 10 may start self-driving. For example, if the user inputs the destination by using a microphone (not illustrated) or a terminal (not illustrated), the vehicle 10 may set the input destination at the end of a planned route and start self-driving.

While the vehicle 10 travels, the vehicle 10 may receive a user input requesting display of a peripheral environment image. For example, the user may utter a voice command such as "Peripheral environment image" (902). The vehicle 10 may determine whether or not a traveling route has been set (903). The traveling route may include a planned traveling route of the vehicle 10 toward the destination or a virtual traveling route set through the processes described above with reference to FIG. 3A and FIG. 3B.

When it is determined that the traveling route has been set in advance (Yes in 903), the vehicle 10 may display a peripheral environment image corresponding to the preset traveling route. In this case, the vehicle 10 may display the virtual traveling route or a planned traveling route of the vehicle 10 together (904). For example, the vehicle 10 may display the traveling route through a manipulable UI (for example, a popup UI) on a window. In contrast, when it is determined that no traveling route has been set (No in 903), the vehicle 10 may display images of the periphery of the vehicle 10 without displaying the traveling route (905).

When a peripheral environment image is displayed, the user may manipulate the peripheral environment image (906). For example, the user may manipulate the peripheral environment image through multimodal interaction.

Figure 10:
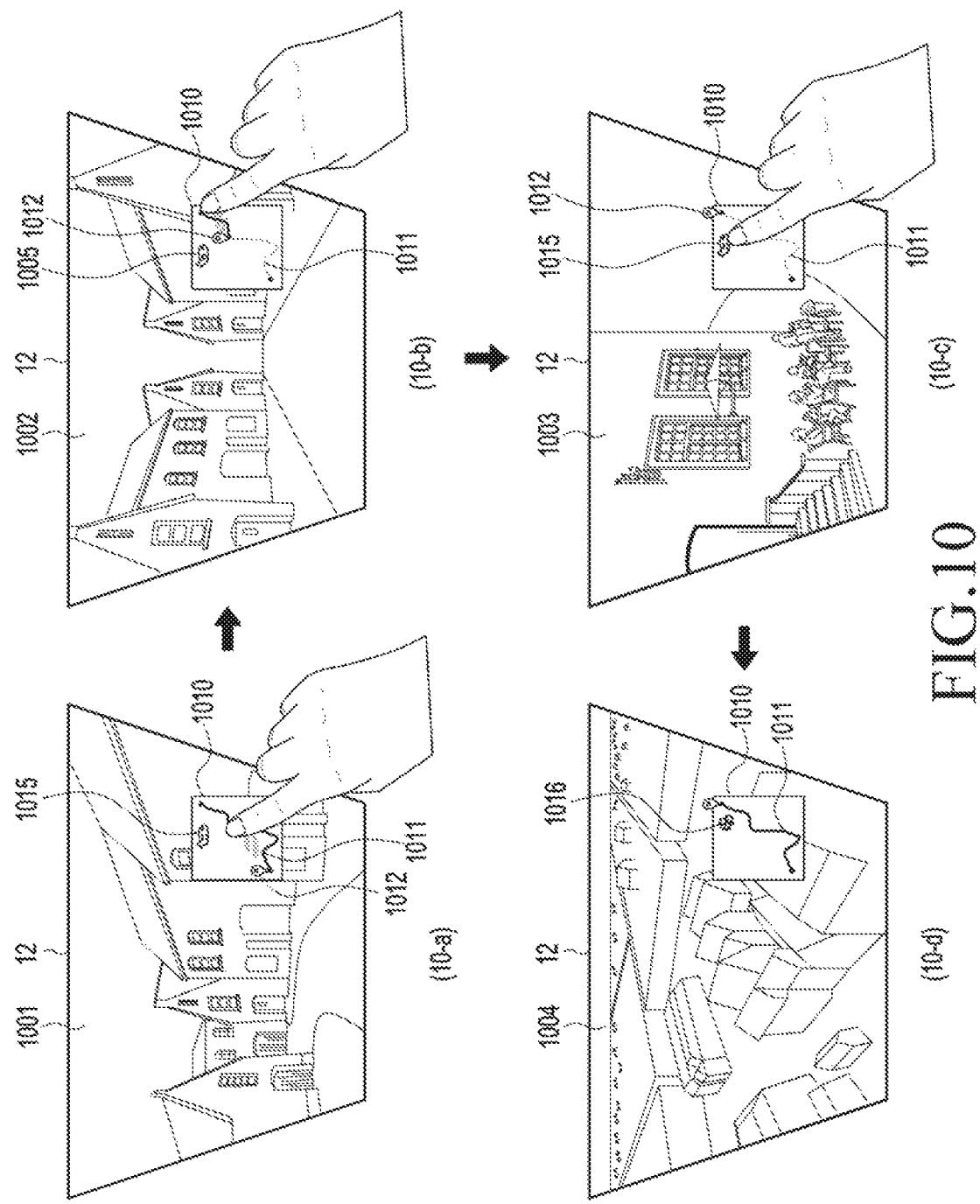
FIG. 10 is a diagram illustrating the display of peripheral environment images when a traveling route has been set according to various embodiments.
Figure 11:
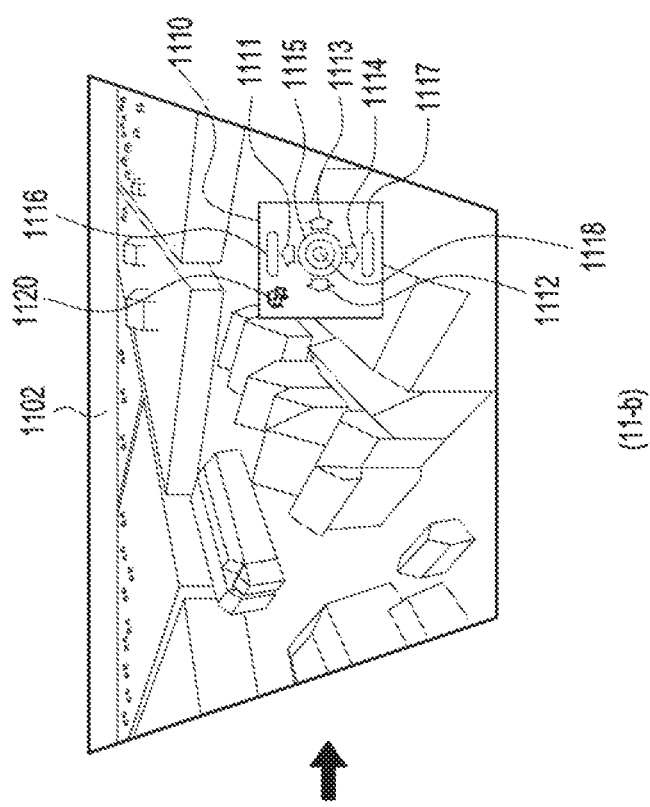
FIG. 11 is a diagram illustrating the display of peripheral environment images when a traveling route has not been set according to various embodiments.
Figure 11:
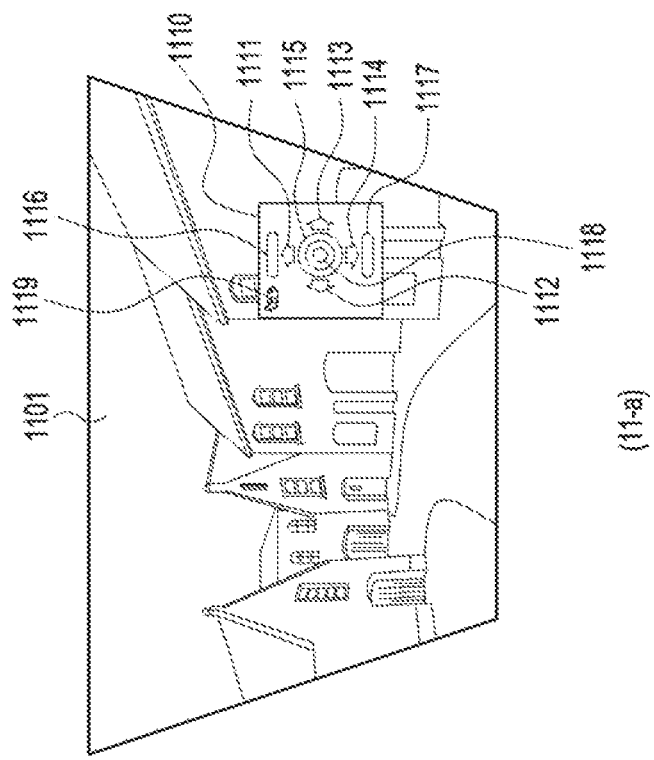

FIG. 10 is a diagram illustrating the display of peripheral environment images when a traveling route has been set, according to various embodiments. FIG. 11 is a diagram illustrating the display of peripheral environment images when a traveling route has not been set, according to various embodiments.

According to an embodiment, in FIG. 10, the vehicle 10 may display peripheral environment images through the display 12 (for example, a window). In this case, the vehicle may display a virtual traveling route or a planned traveling route of the vehicle 10 together through the display 12.

For example, in (10-*a*) of FIG. 10, the peripheral environment image 1001 at the current location (for example, the starting point of the vehicle) of the vehicle 10 may be displayed. The peripheral environment image 1001 at the current location may be the actual scenery outside the window, which is visible to the user through the transparent display 12, or a virtual peripheral environment image which is obtained by processing images of the actual scenery outside the window, or which is the peripheral environment image of another vehicle taken at the current location.

The vehicle 10 may display a manipulable UI (for example, a popup UI) 1010 including the traveling route 1011. An indicator 1012 may be displayed on the traveling route 1011 so as to indicate the current location of the vehicle 10. The user may drag and move the indicator 1012 or may touch a location on the traveling route 1011 so as to change the peripheral environment image. The changed virtual peripheral environment image may be a prestored preview image or an image (still or moving) converted on the basis of vehicle-related information of the vehicle 10.

For example, in (10-*a*) of FIG. 10, the user may drag the indicator 1012 to another location (for example, the middle point) on the traveling route 1011. Alternatively, the user may touch the other location on the traveling route 1011.

In response to the user's input, as in (10-*b*) of FIG. 10, the indicator 1012 may be moved to the other location on the traveling route 1011, and the vehicle 10 may display a virtual peripheral environment image 1002 corresponding to the other location through the display 12. The user may again select the indicator 1012 and drag the same to yet another location (for example, the destination) on the traveling route 1011, or may touch the destination.

In response to the user input, as in (10-*c*) of FIG. 10, the indicator 1012 may be moved to the destination of the traveling route 1011, and the vehicle 10 may display a virtual peripheral environment image 1003 corresponding to the destination through the display 12. Meanwhile, the manipulable UI (for example, the popup UI) 1010 may include view mode switching buttons 1015 and 1016. The first view mode switching button 1015, when selected by the user, may provide a virtual peripheral environment image in an aerial view mode. For example, if the first view mode switching button 1015 is selected by the user in (10-*c*) of FIG. 10, the vehicle 10 may display a virtual peripheral environment image 1004 in an aerial view mode through the display 12 as in (10-*d*) of FIG. 10. The manipulable UI 1010 of (10-*d*) of FIG. 10 may include a second view mode switching button 1016. In this case, if the second view mode switching button 1016 is selected by the user, the vehicle 10 may display a virtual peripheral environment image 1003 in a road view mode again through the display 12 as in (10-*c*) of FIG. 10.

According to another embodiment, referring to FIG. 11, the vehicle 10 displays peripheral environment images through a display 12 (for example, a window) when no traveling route has been set.

For example, in (11-a) of FIG. 11, the peripheral environment image 1101 at the current location (for example, the starting point of the vehicle) of the vehicle 10 may be displayed. The peripheral environment image 1101 at the current location may be the actual scenery outside the window, which is visible to the user through a transparent display 12, or a virtual peripheral environment image which is obtained by processing images of the actual scenery outside the window, or which is the peripheral environment image of another vehicle taken at the current location.

In this case, the vehicle 10 may display an interface 1110 for virtual traveling. For example, the vehicle 10 may display a manipulable UI (for example, a popup UI) 1110 including at least one manipulation button together with the virtual peripheral environment image.

The at least one manipulation button may include, for example, upward/downward/leftward/rightward view movement buttons 1111-1114. In response to a user input of touching one of the view movement buttons 1111-1114, the vehicle 10 may display a virtual peripheral environment image, which has undergone image processing such that the peripheral environment image 1101 moves in the corresponding direction (for example, upward direction) on the display 12. Accordingly, the peripheral environment image 1101 may be changed to an image whose point of view is moved upward from the original peripheral environment image 1101. In addition, the at least one manipulation button may include a panning button 1115. In this case, in response to a user input of panning the panning button 1115 clockwise or counterclockwise, the vehicle 10 may image-process the peripheral environment image 1101 so as to turn right and display the same through the display 12, or may image-process the peripheral environment image 1101 so as to turn left and display the same through the display 12. In addition, the at least one manipulation button may include a forward movement button 1116 or a backward movement button 1117. In this case, in response to a user input of selecting the forward movement button 1116, the vehicle 10 may display a virtual peripheral environment image corresponding to a forward location of the vehicle's current location through the display 12. In addition, in response to a user input of selecting the backward movement button 1117, the vehicle 10 may display a virtual peripheral environment image corresponding to a backward location of the planned route through the display 12. In this case, the button selected by the user may be displayed with a visual effect that highlights the selection by the user. For example, the color, shape, or shading of the button may change, or the button may blink. In addition, the at least one manipulation button may include a stop on/off button (or a toggle button) 1118. When the stop on/off button 1118 is in an off-state, the vehicle 10 may display a still image as the currently displayed peripheral environment image, or may not perform functions corresponding to the user's manipulation of the buttons 1111-1117 described above. In contrast, when the stop on/off button 1119 is in an on-state, the vehicle 10 may change the peripheral environment image in real time as the vehicle 10 moves, or may change the virtual peripheral environment image in response to the user's manipulation of the buttons 1111-1117 described above.

In addition, the at least one manipulation button may include a first view mode switching button 1119. In response to a user input of selecting the first view mode switching button 1119, the vehicle 10 may display a virtual peripheral environment image 1102 in an aerial view mode through the display 12 as in (11-b) of FIG. 11. In this case, the first view mode switching button 1119 may be changed to a second view mode switching button 1120. If the second view mode switching button 1120 is selected by the user, the vehicle 10 may display a virtual peripheral environment image 1101 in a road view mode again through the display 12 as in (11-a) of FIG. 11.

Figure 12:
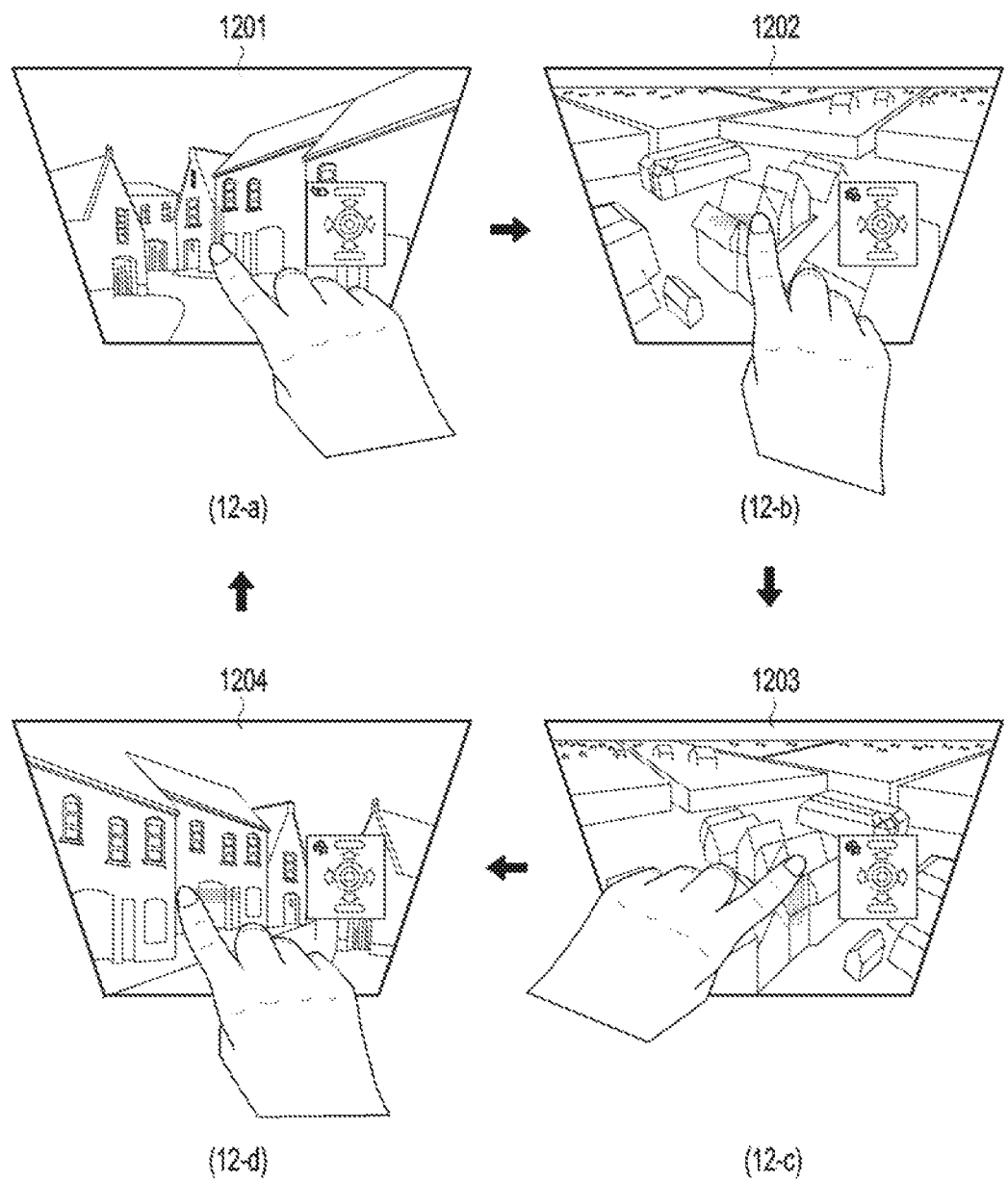
FIG. 12 is a diagram illustrating changing peripheral environment images according to various embodiments.

FIG. 12 is a diagram illustrating changing peripheral environment images according to various embodiments.

In FIG. 12, in response to a user input of conducting a drag on the display 12, the vehicle may display virtual peripheral environment images in various directions through the display. For example, virtual peripheral environment images of multi-view video type may be generated to provide user with various directions of view. For example, in a situation in which a first virtual peripheral environment image 1201 is displayed as in (12-a) of FIG. 12, and in response to a user input of a downward drag, the vehicle 10 may display a second virtual peripheral environment image 1202 corresponding to the user's view from above (top view or aerial view) through the display as in (12-b) of FIG. 12. In addition, in a situation in which the second virtual peripheral environment image 1202 is displayed, and in response to a user input of a rightward drag, the vehicle 10 may display a third virtual peripheral environment image 1203 corresponding to a view of the user who shifted to left side from a view position in the previous view 1202 as in (12-c) of FIG. 12. In addition, in a situation in which the third virtual peripheral environment image 1203 is displayed, and in response to a user input of an upward drag, the vehicle 10 may display a fourth virtual peripheral environment image 1204 corresponding to the user's view from the ground (bottom view) through the display as in (12-d) of FIG. 12. In addition, in a situation in which the fourth virtual peripheral environment image 1204 is displayed, and in response to a user input of a leftward drag, the vehicle 10 may again display the first virtual peripheral environment image 1201 corresponding to a view of the user who shifted to right side from a view position in the previous view 1204 through the display as in (12-a) of FIG. 12.

In FIG. 12, the vehicle 10 may display virtual peripheral environment images depending on the degree of dragging. For example, as dragging proceeds, the vehicle 10 may gradually change the point of view of the virtual peripheral environment image. Alternatively, the vehicle may display a virtual peripheral environment image and change the inclination of the point of view from the ground in proportion to the degree of movement of the drag. Alternatively, the vehicle 10 may adjust the rate at which the point of view changes in proportion to the rate of the drag.

Figure 13:
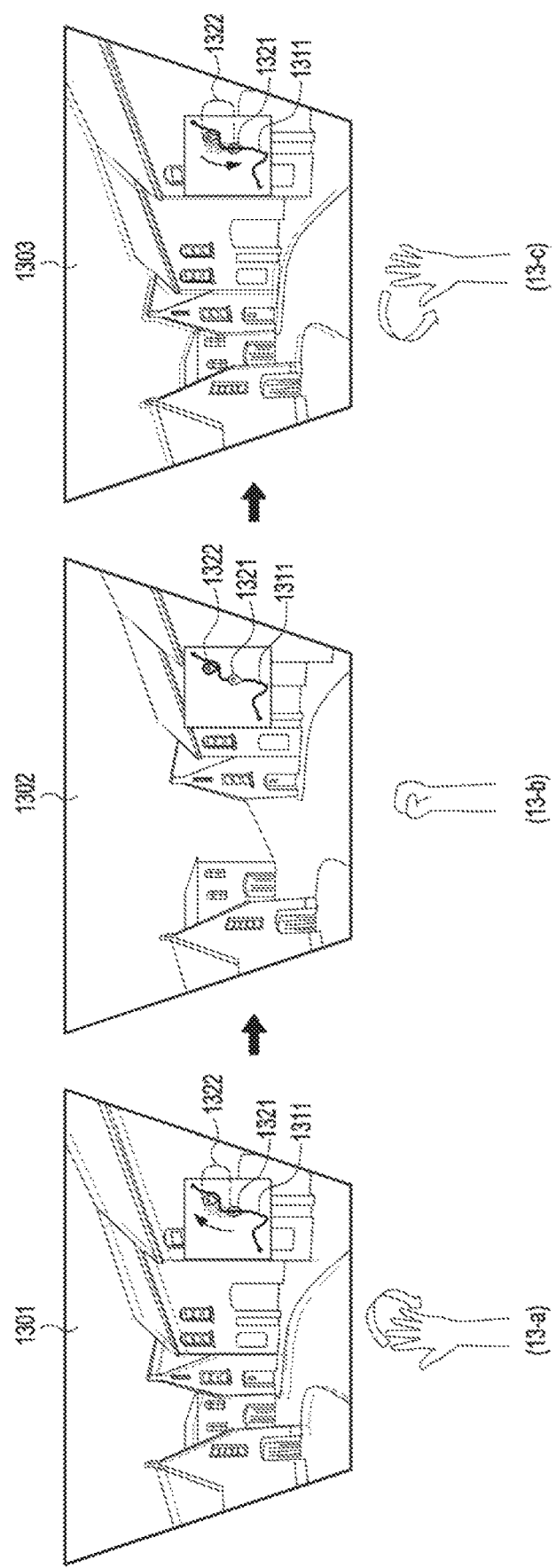
FIG. 13 is a diagram illustrating the display of peripheral environment images using gestures when a traveling route has been set according to various embodiments.
Figure 14A:
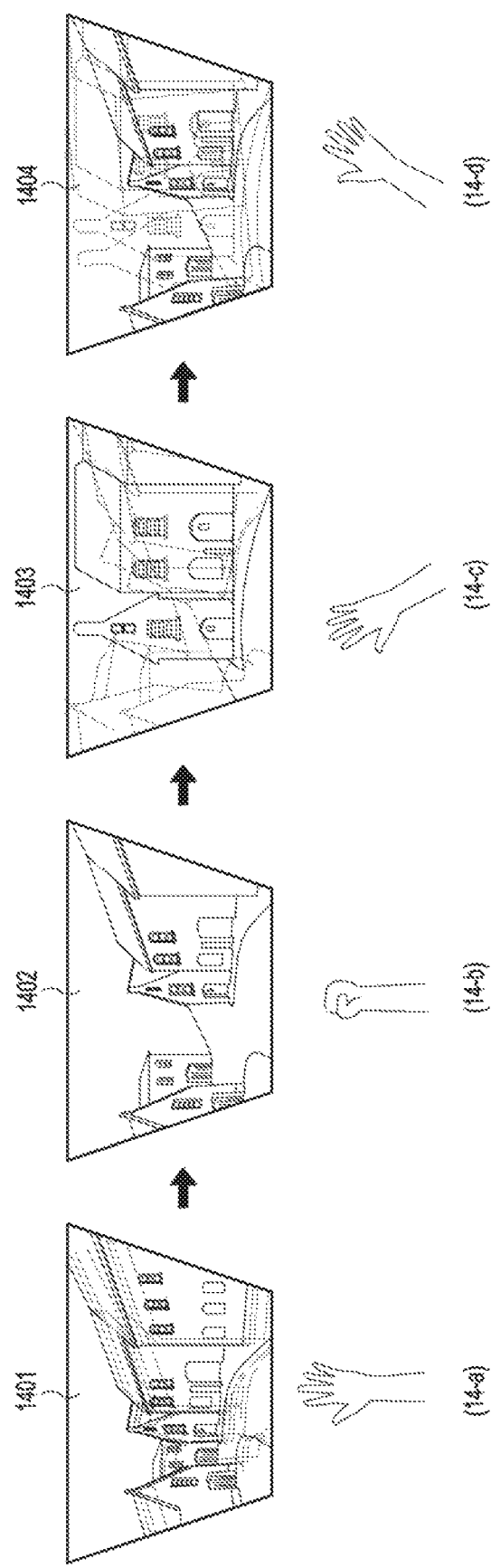
FIG. 14A is a diagram illustrating the display of virtual peripheral environment images using gestures when a traveling route has not been set according to various embodiments.
Figure 14B:
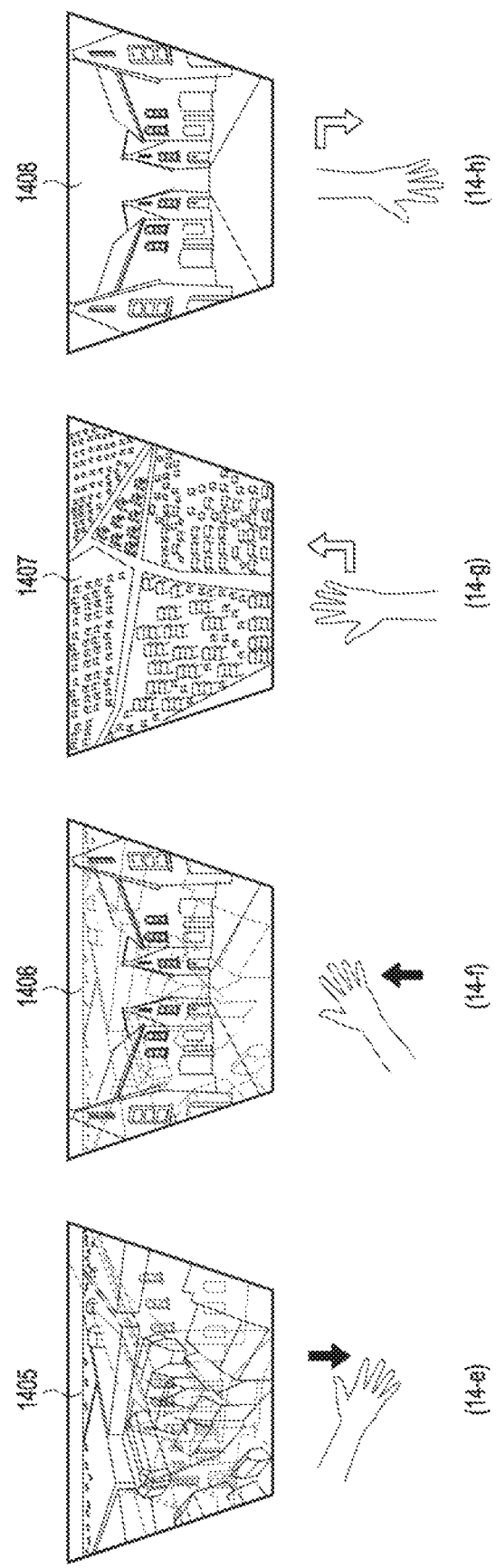
FIG. 14B is a diagram illustrating the display of virtual peripheral environment images using gestures when a traveling route has not been set according to various embodiments.

FIG. 13 is a diagram illustrating the display of peripheral environment images using gestures according to various embodiments. FIG. 14A is a diagram illustrating the display of peripheral environment images using gestures according to various embodiments. FIG. 14B is a diagram illustrating the display of peripheral environment images using gestures according to various embodiments.

Specifically, FIG. 13 illustrates manipulating virtual peripheral environment images by using gestures when a traveling route has been set. FIG. 14A illustrates manipulating virtual peripheral environment images by using gestures when a traveling route has not been set. FIG. 14B also illustrates manipulating virtual peripheral environment images by using gestures when a traveling route has not been set.

In FIG. 13, in response to a user input of performing a gesture, the vehicle 10 may display a virtual peripheral environment image at a specific location on the traveling route 1311 through the display 12.

Initially, as in (13-a) of FIG. 13, if the user rotates his hand clockwise (or makes a circular movement), the vehicle 10 may display consecutive virtual peripheral environment images 1301 in the forward direction (i.e. toward the destination along the traveling route 1311), through the display 12. On the traveling route 1311, an indicator 1321 corresponding to the current location of the vehicle 10 and indicators 1322 corresponding to virtual traveling location during the forward movement toward the destination may be displayed. While the user rotates the hand, the indicators 1322 corresponding to the virtual traveling locations may gradually move toward the destination. In this case, virtual peripheral environment images corresponding to the locations of the indicators 1322 moving in the forward direction may be displayed through the display 12.

If the user clenches his/her first or stops rotating the hand as in (13-b) of FIG. 13, the vehicle 10 may stop moving the indicator 1322. In this case, the virtual peripheral environment image displayed through the display 12 may be a virtual peripheral environment image corresponding to the location of the indicator 1322 which has stopped moving.

Furthermore, if the user rotates the hand counterclockwise as in (13-c) of FIG. 13, the vehicle 10 may display consecutive virtual peripheral environment images 1303 in the backward direction (i.e. toward the starting point along the traveling route 1311), through the display 12 while the user rotates the hand. On the traveling route 1311, an indicator 1321 corresponding to the current location of the vehicle 10 and indicators 1322 corresponding to virtual traveling locations during the backward movement toward the starting point may be displayed. While the user rotates the hand, the indicators 1322 corresponding to the virtual traveling locations may gradually move toward the starting point. In this case, virtual peripheral environment images corresponding to the locations of the indicators 1322 moving in the backward direction may be displayed through the display 12.

FIG. 14A is a diagram illustrating the display of peripheral environment images by using gestures when a traveling route has not been set according to an embodiment. FIG. 14B is a diagram also illustrating the display of peripheral environment images by using gestures when a traveling route has not been set according to an embodiment.

In (14-a) of FIG. 14A, if the user performs a gesture of holding out (or extending) his hand toward the front, the vehicle 10 may gradually display virtual peripheral environment images 1401 ahead of the current location of the vehicle 10 on the expected traveling route through the display 12. Alternatively, the vehicle 10 may magnify the peripheral environment image at the current location and display the same through the display 12.

If the user clenches his/her first or stops the extension of the hand as in (14-b) of FIG. 14A, the vehicle 10 may pause the forward movement of the virtual peripheral environment image 1402.

If the user rotates his/her hand in the leftward direction as in (14-c) of FIG. 14A, the vehicle 10 may pan the virtual peripheral environment image 1403 to the right through the display 12. The angle of the panning may correspond to the degree of rotation of the user's hand in the leftward direction.

If the user rotates his/her hand in the rightward direction as in (14-d) of FIG. 14A, the vehicle 10 may pan the virtual peripheral environment image 1404 to the left through the display 12. The angle of the panning may correspond the degree of rotation of the user's hand in the rightward direction.

If the user lowers his/her hand in the downward direction as in (14-e) of FIG. 14B, the vehicle 10 may display the virtual peripheral environment image 1405 corresponding to a bird's eye view. The angle of inclination for the bird's eye view may gradually increase in proportion to the degree of lowering the hand. For example, as the degree of lowering the hand increases, higher angle images may be displayed.

If the user lifts his/her hand in the upward direction as in (14-f) of FIG. 14B, the vehicle may display the virtual peripheral environment image 1406 corresponding to the user's view from the ground. The angle of inclination may gradually increase in proportion to the degree of lifting the hand. For example, as the degree of lifting the hand increases, lower angle images may be displayed.

If the user performs a gesture of moving his/her hand to the right (or left) and bending the same upward as in (14-g) of FIG. 14B, the vehicle 10 may display the virtual peripheral environment image in an aerial view mode through the display 12.

In addition, if the user performs a gesture of moving his/her hand to the right (or left) and bending the same downward as in (14-h) of FIG. 14B, the vehicle 10 may display the virtual peripheral environment image in a road view mode through the display 12.

The various gestures described above with reference to FIG. 13 and FIG. 14B are mere examples, and other types of user gestures may also be used if they can improve user convenience. In addition, the various ways of displaying peripheral environment images by using gestures described above with reference to FIG. 13 and FIG. 14B can be alternatively implemented by using manipulation buttons of manipulable UIs described above with reference to FIG. 10 to FIG. 12.

Figure 15:
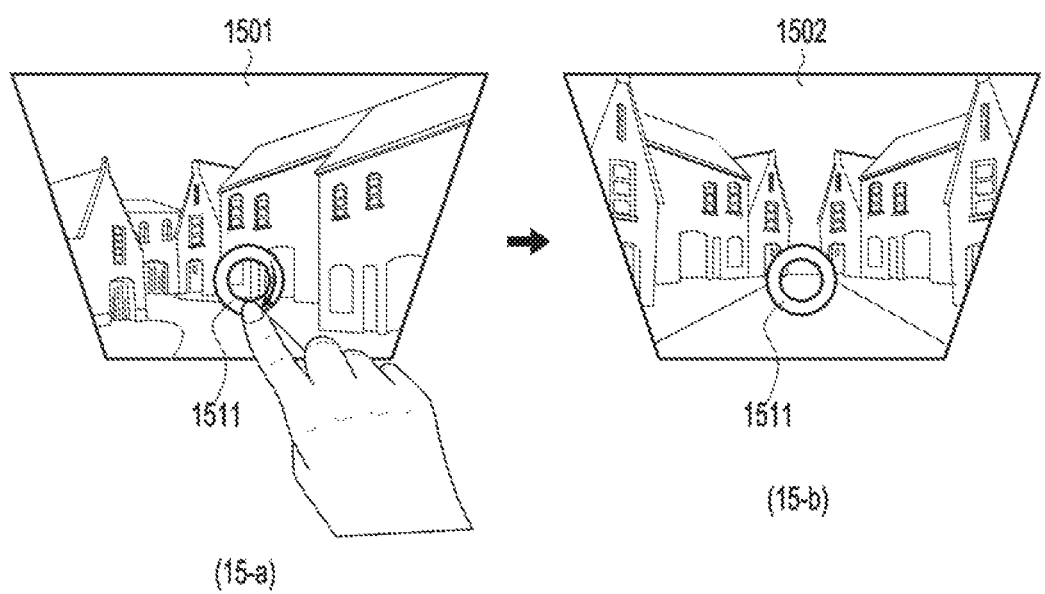
FIG. 15 is a diagram illustrating a UI for exploring a traveling route according to various embodiments.

FIG. 15 is a diagram illustrating a UI for exploring a traveling route according to various embodiments.

In FIG. 15, the user may explore the traveling route in advance by using a virtual peripheral environment image or may perform simulated traveling.

For example, if the user selects a location on the navigation map through the vehicle 10 or the electronic device 100, the vehicle 10 may display the peripheral environment image 1501 at the specific location through the display 12 as in (15-a) of FIG. 15. The display 12 may also display a manipulable UI (for example, a spin wheel UI) 1511, by which the traveling route can be explored.

The user may explore the traveling route in advance by using the manipulable UI 1511 to attempt simulated traveling. For example, in response to a user input of rotating the spin wheel 1511, the vehicle 10 may display the peripheral environment image 1502 at another location through the display 12 as in (15-b) of FIG. 15. By moving the spin wheel 1511 in a specific direction or rotating the same in a specific direction in this manner, the user can explore the traveling route along which the vehicle 10 is scheduled to travel in advance to perform simulated traveling.

According to various embodiments, the manipulable UI 1010 of FIG. 10, the manipulable UI 1110 of FIG. 11, and the manipulable UI 1511 of FIG. 15 may be displayed through the display 12 provided in the vehicle 10 or through the display of the electronic device 100 held by the user of the vehicle 10. When the manipulable UIs 1010, 1110, and 1511 are displayed through the user's electronic device (also may be referred to herein as a terminal), command data resulting from the user's manipulation and corresponding response data may be transmitted/received between the terminal and the vehicle 10 via short-range communication. The manipulable UI 1511 may also be displayed through both the display 12 provided in the vehicle 10 and the display of the terminal. In this case, the screen of the display of the terminal may mirror the display 12 provided in the vehicle 10. Alternatively, if command data resulting from the user manipulation is transmitted to the vehicle 10, the vehicle 10 may display information corresponding to the command data through the display 12.

Figure 16:
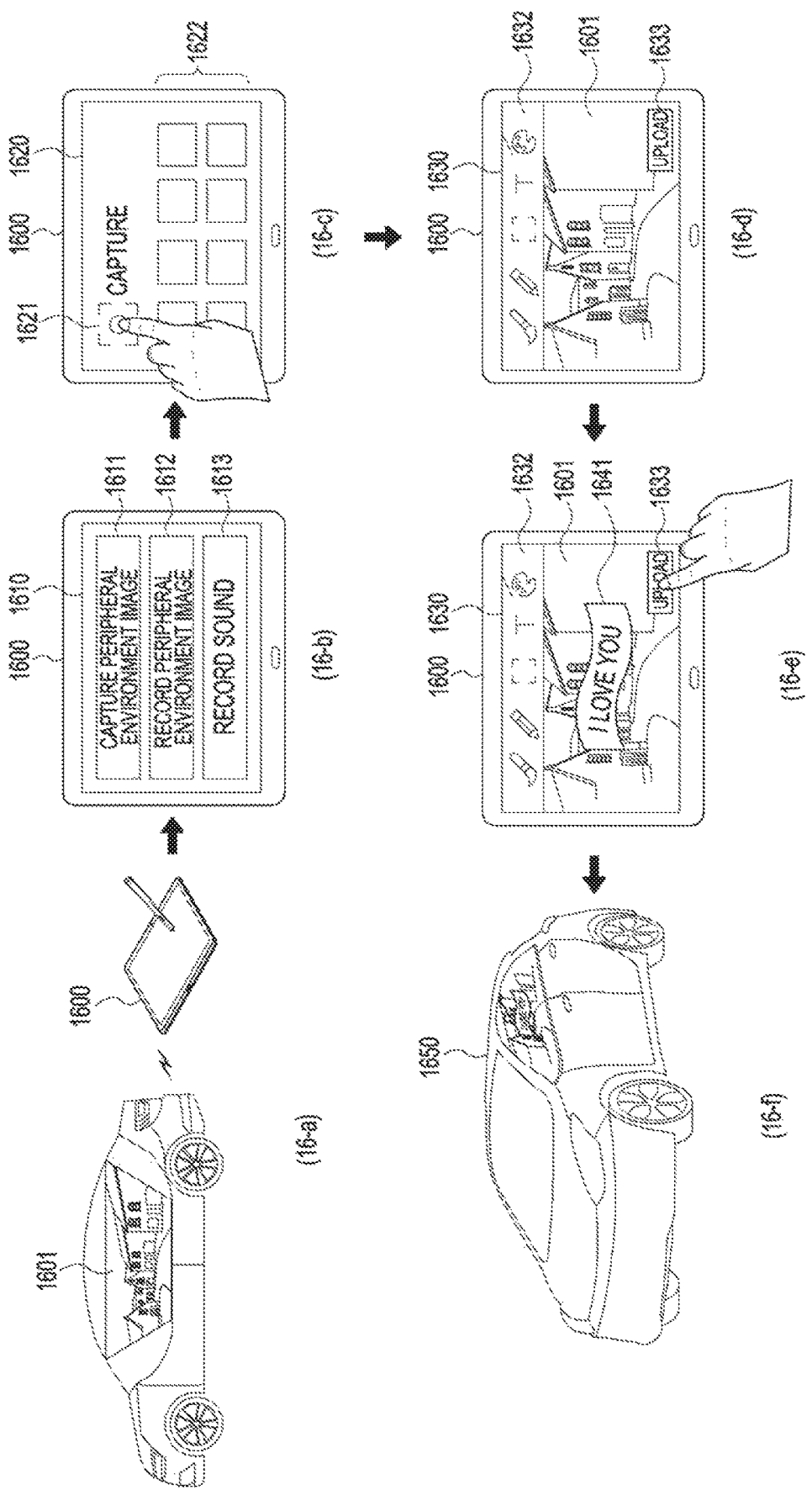
FIG. 16 is a diagram illustrating a process of utilizing virtual peripheral environment images according to various embodiments.

FIG. 16 is a diagram illustrating a process of utilizing virtual peripheral environment images according to various embodiments.

As in (16-a) of FIG. 16, the vehicle 10 may communicate with a terminal 1600. For example, the vehicle 10 and the terminal 1600 may communicate with each other via short-range communication (for example, Bluetooth, Bluetooth low energy, Zigbee, ultra-wideband (UWB) communication, or Wi-Fi).

In this case, the terminal 1600 may share the peripheral environment image currently displayed through the display 12 of the vehicle 10 with a third person (e.g. a passenger in the vehicle 10).

For example, in (16-b) of FIG. 16, the terminal 1600 may display a screen 1610 for executing an authoring application supporting the above function. The authoring application execution screen 1610 may include a capture UI 1611 for capturing the peripheral environment image that is being displayed through the display 12 of the vehicle 10, an image-recording UI 1612 for recording the peripheral environment image in a specific section, and a sound-recording UI 1613 for storing the voice of the user of the vehicle 10.

In this case, if a user input of selecting the capture UI 1611 is performed, the terminal 1600 may display a capture screen 1620 by which peripheral environment images can be captured as in (16-c) of FIG. 16. The capture screen 1620 may include a capture button 1621 that enables capturing and a thumbnail list 1622 that displays the list of captured peripheral environment images.

If a user input of selecting the capture button 1621 is performed, the terminal 1600 may receive a peripheral environment image 1601 from the vehicle 10 and display the same through the screen as in (16-d) of FIG. 16. For example, if the terminal 1600 requests the vehicle 10 to provide a peripheral environment image in response to the user input, the vehicle 10 may transmit the currently displayed peripheral environment image 1601 to the terminal 1600 in response thereto.

After receiving the peripheral environment image 1601, the terminal 1600 may display an editing screen 1630 including authoring tools 1632, by which the received peripheral environment image 1601 can be edited, through the screen as in (16-d) of FIG. 16.

The user can edit the peripheral environment image 1601 by using the authoring tools 1632. For example, the user may insert a text 1641 such as "I love you" into the peripheral environment image 1601 as in (16-e) of FIG. 16. Next, if the user selects the upload button 1633, the terminal 1600 may upload the edited virtual peripheral environment image to an external server (for example, the V2X server 40). According to various embodiments, when the virtual peripheral environment image is transmitted to the external server, the terminal 1600 may transmit location information corresponding to the virtual peripheral environment image and information regarding the third person who wants to share the virtual peripheral environment image together. The information regarding the third person may be, for example, information that enables the V2X server 40 to recognize the vehicle 10. Specifically, the information regarding the third person may be vehicle identification information such as a vehicle registration number or a vehicle manufacturing number, or vehicle owner information. According to various embodiments, when the virtual peripheral environment image is stored in the external server, the terminal 1600 may match recorded audio data with the virtual peripheral environment image and transmit the same together to the external server.

The external server (for example, the V2X server 40) may store the edited virtual peripheral environment image and additional information (for example, audio data, location information, vehicle 10 identification information, or third person vehicle identification information) matching with the peripheral environment image.

Thereafter, if another person's vehicle 1650 travels at the location corresponding to the virtual peripheral environment image or near the location, the external server may transmit the virtual peripheral environment image and the additional information to that person's vehicle 1650. When the peripheral environment image and the additional information are transmitted to the vehicle 1650, the vehicle 1650 may display the received peripheral environment image and additional information through the display as in (16-f) of FIG. 16. According to various embodiments, when the additional information includes sound recording information, the vehicle 1650 may playback the sound recording information while displaying the peripheral environment image.

According to various embodiments, if the user's input of selecting the image recording UI 1612 is performed in (16-b) of FIG. 16, the terminal 1600 may receive peripheral environment images in a predetermined section of the traveling route from the vehicle 10. For example, the terminal 1600 may receive, from the vehicle 10, a peripheral environment image corresponding to a section of traveling of the vehicle 10 between when the user has started image recording and when the user has ended the same. After acquiring the peripheral environment image corresponding to a predetermined section, the terminal 1600 may provide authoring tools by which the peripheral environment image can be edited. The user may delete or edit a predetermined section of the moving image-type peripheral environment image by using the authoring tools. Alternatively, the user may insert a new prestored moving image or may take a new moving image and insert the same into the peripheral environment image. After the edited peripheral environment image is generated, the terminal 1600 may transmit the edited peripheral environment image and additional information regarding the peripheral environment image to the external server.

Thereafter, if another person's vehicle 1650 travels at the location corresponding to the virtual peripheral environment image or near the location, the external server may transmit the virtual peripheral environment image and the additional information to the vehicle 1650. The vehicle 1650 may display the peripheral environment image provided by the vehicle 10, instead of the peripheral environment image provided by the vehicle 1650, through the display 12 during the traveling section corresponding to the received peripheral environment image.

According to various embodiments, if the user's input of selecting the sound recording UI 1613 is performed in (16-b) of FIG. 16, the terminal 1600 may perform a sound recording function. For example, the terminal 1600 may record the voice uttered by the user in the vehicle or record the sound outside the vehicle. After the sound recording is completed, the terminal 1600 may transmit, to the external server, the recorded audio data and information regarding the location of sound recording as additional information. The information regarding the location of sound recording may include information regarding the location of the vehicle 10 at which the sound recording has started or information regarding the location of the vehicle 10 at which the sound recording has ended. In addition, the terminal 1600 may transmit, to the external server, identification information of the vehicle 10 or identification information of another person's vehicle as additional information.

Thereafter, if the other person's vehicle 1650 travels at the location corresponding to the location information or near the location, the external server may transmit the recorded audio data and additional information to the third person's vehicle 1650. The vehicle 1650 may playback the received audio data through a speaker.

Figure 17:
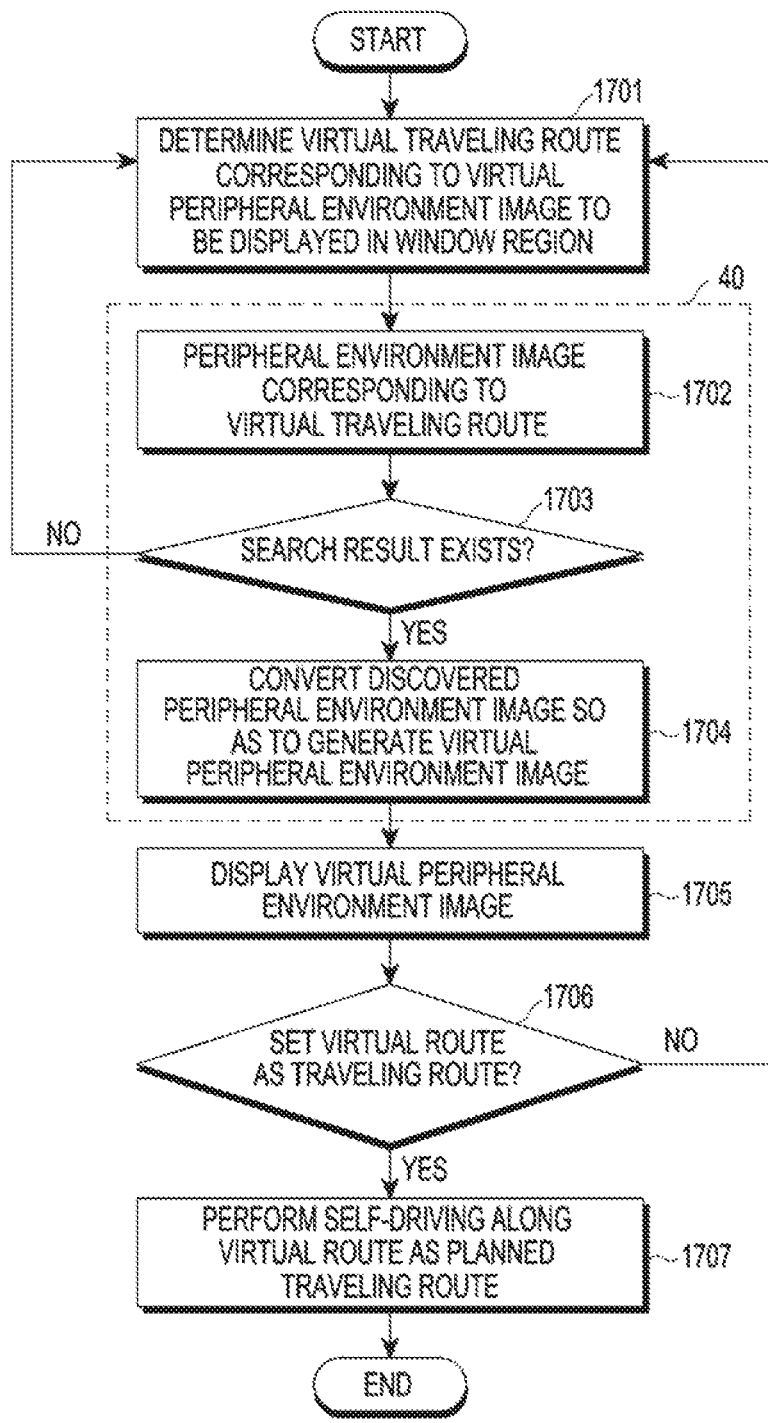
FIG. 17 is a flowchart illustrating a method of self-driving performed a vehicle according to various embodiments.

FIG. 17 is a flowchart illustrating a method of self-driving performed a vehicle 10 according to various embodiments.

Initially, the vehicle 10 may determine a virtual route corresponding to a virtual peripheral environment image to be displayed through the display (for example, a window region) 12 (1701). For example, the vehicle 10 may determine the virtual route to be displayed through the display on the basis of a user input of setting the virtual route, as described above with reference to FIG. 3A and FIG. 3B.

After the virtual route is determined, the vehicle 10 may transmit virtual route information to the V2X server 40.

The V2X server 40 may search for a peripheral environment image corresponding to the virtual route on the basis of the virtual route information (1702).

When the search result exists (Yes in 1703), the V2X server 40 may convert the discovered peripheral environment image so as to generate a virtual peripheral environment image that reflect the traveling situation of the vehicle 10 (1704).

After the virtual peripheral environment image is generated, the V2X server 40 may transmit the generated virtual peripheral environment image to the vehicle 10. In this case, the V2X server 40 may encode the virtual peripheral environment image and transmit the same to the vehicle 10.

The vehicle 10 may decode the encoded virtual peripheral environment image, render the decoded virtual peripheral environment image, and display the same through the display 12 (1705).

Next, the vehicle 10 may determine whether or not a user input for setting the virtual route as the actual traveling route of the vehicle 10 is received (1706). When a user input for setting the virtual route as the actual traveling route is received (Yes in 1706), the vehicle 10 may self-drive to the starting point of the virtual route and perform self-driving along the virtual route as the planned traveling route (1707).

Figure 18:
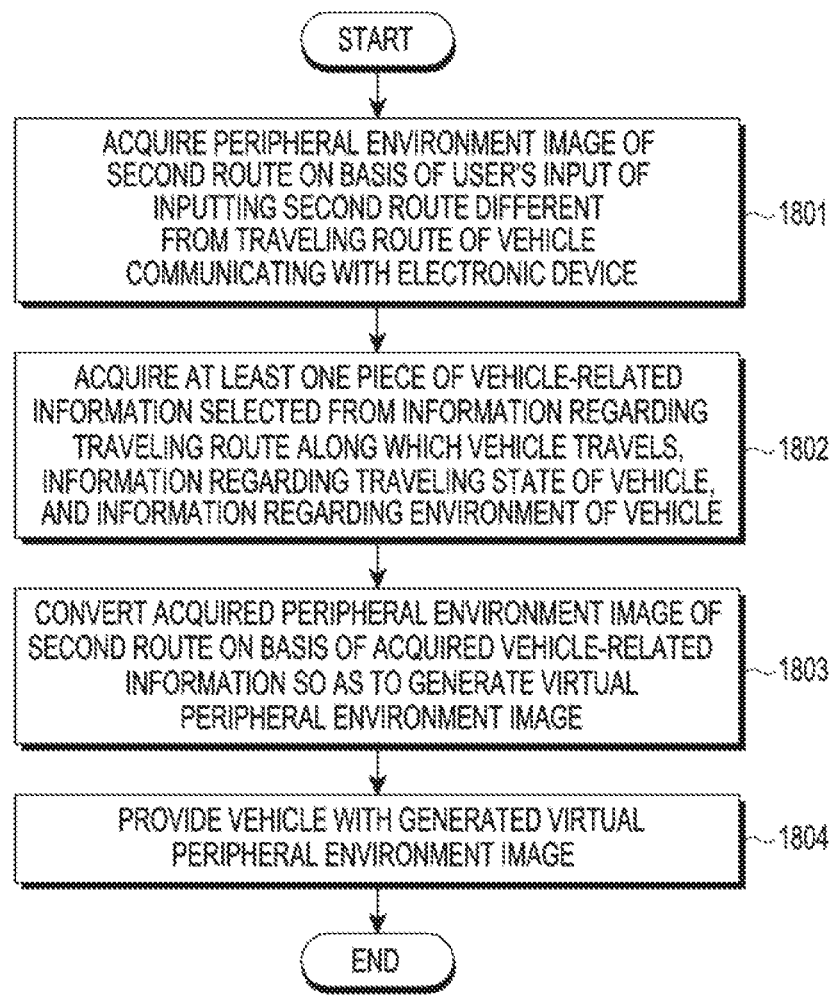
FIG. 18 is a flowchart illustrating a method for providing peripheral environment images by an electronic device according to various embodiments.

FIG. 18 is a flowchart illustrating a method for providing peripheral environment images by an electronic device 100 according to various embodiments.

Initially, on the basis of a user input of inputting a second route different from the traveling route of the vehicle 10 that is communicating with the electronic device 100, the peripheral environment image of the second route may be acquired (1801). The second route may include a planned route along which the vehicle 10 is scheduled to travel. In addition, the electronic device 100 may control the second route information resulting from the user's input to be transmitted to the V2X server 40, and may acquire the peripheral environment image of the second route from the V2X server 40. The electronic device 100 may also acquire the peripheral environment image at a specific location on the basis of a user input of selecting a specific location on the second route.

The electronic device 100 may acquire at least one piece of vehicle-related information selected from information regarding the traveling route of the vehicle 10, information regarding the traveling state of the vehicle 10, and information regarding the environment of the vehicle 10 (1802).

On the basis of the acquired vehicle-related information and other user inputted conditions and parameters, the electronic device 100 may convert the acquired peripheral environment image of the second route so as to generate a virtual peripheral environment image (1803). In this case, on the basis of the user's input of the condition of the virtual peripheral environment image, the electronic device 100 may convert the acquired peripheral environment image of the second route according to the vehicle-related information and the user condition, thereby generating a virtual peripheral environment image that reflects the vehicle's traveling situation. In addition, when there is no sub peripheral environment image corresponding to a specific section of the second route, the electronic device 100 may modify at least one sub peripheral environment image corresponding to a section adjacent to the specific section, thereby generating a sub peripheral environment image corresponding to the specific section.

The electronic device 100 may provide the vehicle 10 with the generated virtual peripheral environment image (1804).

According to various embodiments, on the basis of the user's input of selecting a second route corresponding to the virtual peripheral environment image as the actual traveling route, the electronic device 100 may control the vehicle 10 so as to self-drive along the second route.

According to various embodiments, the electronic device 100 may edit the virtual peripheral environment image according to a user input and may share the edited virtual peripheral environment image with another person.

Figure 19:
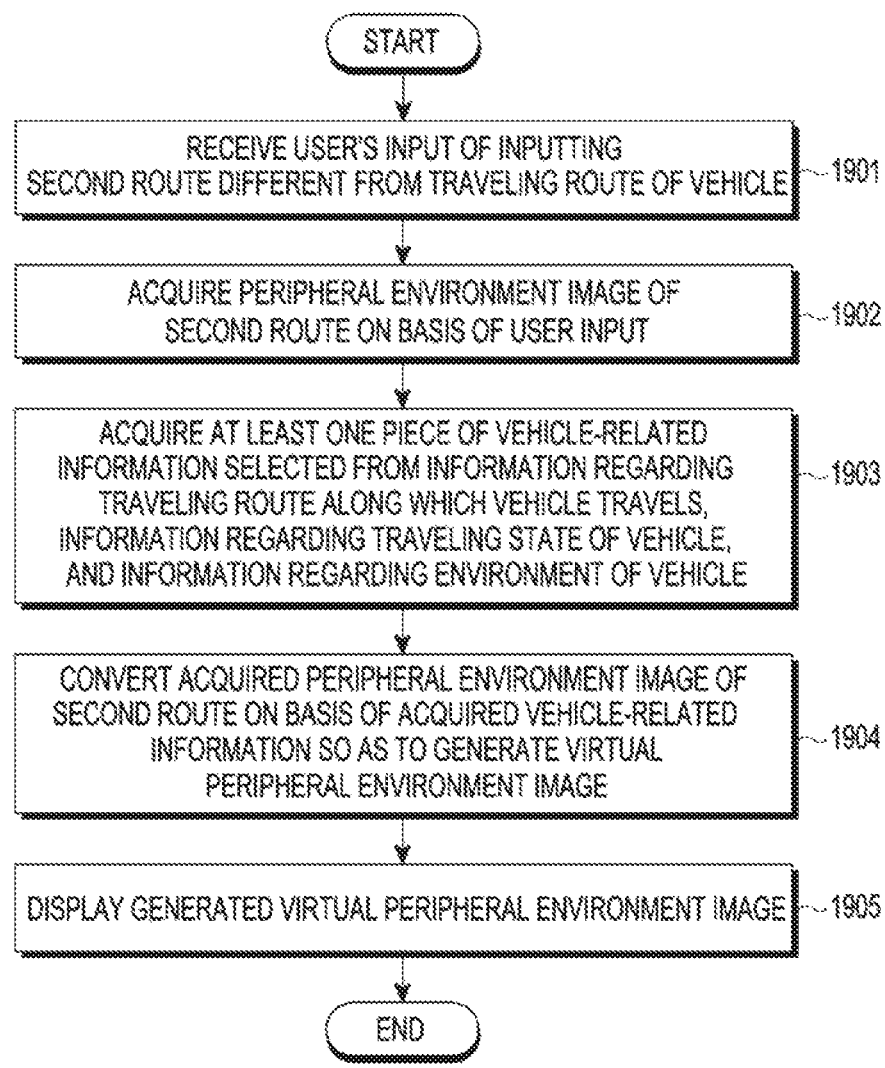
FIG. 19 is a flowchart illustrating a method for displaying peripheral environment images by a vehicle according to various embodiments.

FIG. 19 is a flowchart illustrating a method for displaying peripheral environment images by a vehicle 10 according to various embodiments.

Initially, the vehicle 10 may receive a user input of inputting a second route different from the traveling route of the vehicle 10 (1901).

The vehicle 10 may acquire the peripheral environment image of the second route on the basis of the user input (1902).

The vehicle 10 may acquire at least one piece of vehicle-related information selected from information regarding the traveling route of the vehicle 10, information regarding the traveling state of the vehicle 10, and information regarding the environment of the vehicle 10 (1903).

On the basis of the acquired vehicle-related information, the vehicle 10 may convert the peripheral environment image of the second route, thereby generating a virtual peripheral environment image (1904).

The vehicle 10 may display the generated virtual peripheral environment image (1905).

Figure 20:
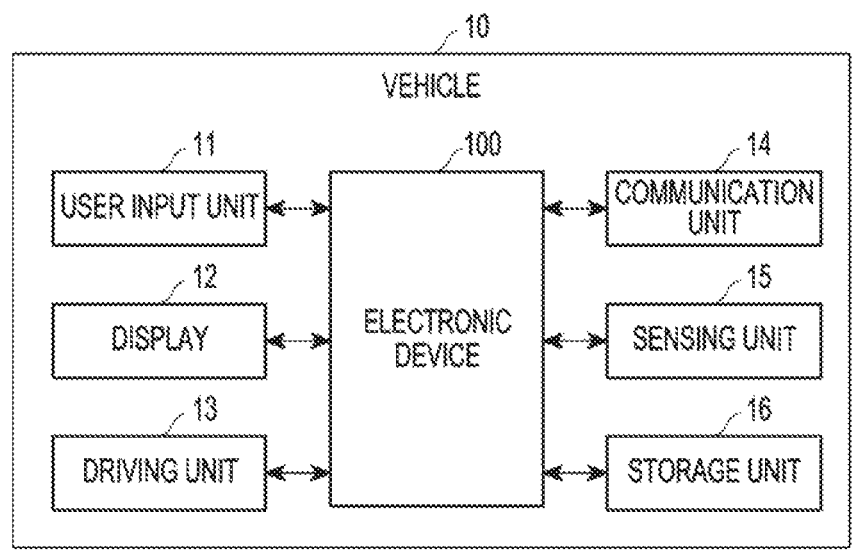
FIG. 20 is a block diagram illustrating the configuration of a vehicle according to an embodiment.

FIG. 20 is a block diagram illustrating the configuration of a vehicle 10 according to an embodiment.

Referring to FIG. 20, the vehicle 10 may include a user input unit 11, a display 12, a driving unit 13, a communication unit 14, a sensing unit 15, a storage unit 16, and an electronic device 100. It can be understood by a person skilled in the art to which the embodiments pertain that the vehicle 10 may further include additional elements other than those illustrated in FIG. 20.

The electronic device 100 may include at least one processor. The processor may include an artificial intelligence (AI) processor, and, in this case, the processor may plan the traveling route of the vehicle 10 by using a learning network model of an AI system. The AI processor may be fabricated as a hardware chip dedicated to AI or may be fabricated as a part of an existing versatile processor (for example, a CPU or an application processor) or a graphic-dedicated processor (for example, a GPU). The electronic device 100 may normally control the overall operation of the vehicle 10. By executing programs stored in the storage unit 16, the electronic device 100 may control the display 12, the driving unit 13, the communication unit 14, and the sensing unit 15 of the vehicle 10.

The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The electronic device 100 may include an image acquisition unit 110, a vehicle information acquisition unit 120, an image processing unit 130, and an image provision unit 140. The image acquisition unit 110, the vehicle information acquisition unit 120, the image processing unit 130, and the image provision unit 140 may be distinguished according to the function of at least one processor, and may be implemented as at least one constituent element. Each constituent element may be a software module or a hardware module. A part of the constituent elements may be configured as a software module, and another part thereof may be configured as a hardware module. The electronic device 100 has been described in detail with reference to FIG. 2, and repeated descriptions thereof will be omitted herein.

The user input unit 11 refers to a means for performing an input by the user (driver, occupant, or the like) in order to control the vehicle 10. For example, the user input unit 11 may include a key pad, a dome switch, a touch pad (contact-based capacitance type, pressure-based resistive type, an infrared sensing type, a surface ultrasound conductance type, an integration-based tension measurement type, a piezoelectric effect type, or the like), a jog wheel, or a jog switch, but is not limited thereto.

The display 12 may display information processed by the electronic device 100 (for example, the peripheral environment image of the second route, a virtual peripheral environment image, a manipulation UI, and the like). The display may display a map including the traveling route, display traveling information, display locations of peripheral vehicles, or display the traveling state, but is not limited thereto.

The display 12 may include, for example, a head-up display, a windshield display, a combiner display, a dashboard display, an area of a window, the rear surface of a seat, a display positioned on a side surface, a front display, a rear display, a 360° display, or a door window, but is not limited thereto.

Meanwhile, when the touch pad of the display 12 is configured in a layered structure such that the same is configured as a touch screen, the display 12 may also be used as an input device (for example, a user input unit 11) besides the output device. The display 12 may include at least one of a liquid crystal display, a thin-film transistor liquid-crystal display, an organic light-emitting diode, a flexible display, a 3D display, and an electrophoretic display. According to an embodiment, the display 12 may include a transparent display. The transparent display may be implemented in a projection type, besides a transparent liquid crystal display (LCD) type, a transparent thin-film electroluminescent (TFEL) panel type, and a transparent OLED type. As used herein, the projection type refers to a type of display that projects images onto a transparent screen and displays the same, such as a head-up display (HUD).

The driving unit 13 may include constituent elements used for driving or self-driving of the vehicle 10. The driving unit 13 may include at least one of a power supply unit, a traveling device unit, and a peripheral device unit, but is not limited thereto. The traveling device unit may include a brake unit, a steering unit, and a throttle. The brake unit may be a combination of mechanisms configured to decelerate the vehicle 10. For example, the brake unit may use friction to reduce the speed of the wheels/tires. The steering unit may be a combination of mechanisms configured to adjust the direction of the vehicle 10. The throttle may be a combination of mechanisms configured to control the vehicle speed by controlling the rate of operation of the engine/motor. In addition, the throttle may adjust the amount of throttle opening, thereby adjusting the amount of mixed gas of fuel/air introduced into the engine/motor, and may control the power and thrust by adjusting the amount of throttle opening.

The peripheral device unit may include a navigation, a light, a turn indicator, a wiper, internal lighting, a heater, and an air conditioner. The navigation may be a system configured to determine the traveling route of the vehicle 10. The navigation may be configured to dynamically update the traveling route while the vehicle 10 travels. For example, the navigation may use data collected by a GPS module in order to determine the traveling route of the vehicle 10. According to certain embodiments, the electronic device 100 may plan the traveling route of the vehicle 10 on the basis of information sensed by the sensing unit 15. The electronic device 100 may control the driving unit 13 according to the planned traveling route. Accordingly, the vehicle 10 may automatically change lanes or adjust the speed without the driver's intervention.

The communication unit 14 may include at least one antenna for wirelessly communicating with another device (for example, a terminal, an external vehicle, or an external server (for example, V2X server)). For example, the communication unit 14 may include at least one constituent element for communication between the vehicle 10 and an external vehicle or between the vehicle 10 and an external server. For example, the communication unit 14 may include at least one of a short-range wireless communication unit, a mobile communication unit, and a broadcast receiving unit, but is not limited thereto. The short-range wireless communication unit may include a Bluetooth communication unit, a Bluetooth low energy (BLR) communication unit, a near-field communication unit, a WLAN (Wi-Fi) communication unit, a Zigbee communication unit, an infrared data association (IrDA) communication unit, a Wi-Fi direct (WFD) communication unit, an ultra-wideband (UWB) communication unit, an Ant+ communication unit, and a microwave (uWave) communication unit, but is not limited thereto. The mobile communication unit transmits/receives radio signals to/from at least one of a base station, an external terminal, and a server in a mobile communication network. The radio signals may include a voice call signal, a video communication call signal, or various types of data according to text/multimedia message transmission/reception. The broadcast receiving unit may receive broadcast signals and/or broadcast-related information from the outside through a broadcast channel. The broadcast channel may include a satellite channel and a terrestrial channel. According to various embodiments, the communication unit 14 may perform vehicle-to-vehicle communication with an external vehicle positioned within a predetermined distance from the vehicle 10 or vehicle-to-infrastructure (V2I) communication with an infrastructure positioned within a predetermined distance from the vehicle 10.

The sensing unit 15 may include multiple sensors configured to sense the peripheral environment. For example, the sensing unit 15 may include at least one of a position sensor (for example, global positioning system (GPS)), a differential GPS (DGPS), an inertial navigation system (INS), an inertial sensor (IMU), a lidar sensor, a radar sensor, an image sensor (for example, a camera, a stereo camera, a mono camera, a wide-angle camera, an around-view camera, or a 3D vision sensor), an ultrasonic sensor, an ultraviolet sensor, a distance sensor, a temperature/humidity sensor, an RGB sensor, and a motion sensor, but is not limited thereto. For example, the sensing unit 15 may include an atmospheric pressure sensor and a dust sensor. According to various embodiments, the motion sensor is configured to sense motion of the vehicle 10 and may include, for example, at least one of a geomagnetic sensor, an acceleration sensor, and a gyroscope sensor, but is not limited thereto. In another embodiment, the image sensor may include multiple cameras, and the multiple cameras may be arranged at multiple locations inside or outside the vehicle 10. For example, three cameras may be arranged on the front part of the vehicle 10, one camera may be arranged on the rear part, two cameras may be arranged on the left part, and two cameras may be arranged on the right part, but this example is not limiting in any manner. In another embodiment, the sensing unit 15 may be a combination of an image sensor and a radar sensor or a combination of an image sensor and a lidar sensor. The function of each sensor could be intuitively inferred from the name by a person skilled in the art, and detailed description thereof will be omitted herein. The sensing unit 15 may transfer sensing values to the electronic device 100 or an external server (for example, V2X server).

The storage unit 16 may store programs for processing and controlling the electronic device 100 or store input/output data (for example, sensing values, road situation information, precise maps, periphery information, traveling routes, and peripheral environment images). The storage unit 16 may include at least one type of storage medium selected from a flash memory type, a hard disk type, a multimedia card micro type, a card type memory (for example, an SD memory, an XD memory or the like), a random access memory (RAM), a static RAM (SRAM), a read-only memory (ROM), an electrically erasable programmable ROM (EEPROM), a programmable read-only memory (PROM), a magnetic memory, a magnetic disk, and an optical disk. In addition, the vehicle 10 may operate a web storage or cloud server that performs a storage function on the Internet.

Further, the vehicle may further include a sound output unit (not illustrated) for outputting audio signals. The sound output unit may output audio data received from the communication unit 14 or stored in the storage unit 16. In addition, the sound output unit may output a sound signal related to a function performed by the vehicle 10. For example, the sound output unit may output sounds for receiving confirmation of the operating mode of the vehicle 10, the traveling route, and the second traveling route. The sound output unit may include a speaker, a buzzer, and the like.

The term "module" or "unit" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. According to an embodiment, for example, the module may be implemented in the form of an application-specific integrated circuit (ASIC).

Various embodiments of the disclosure may be implemented by software (or program) including one or more instructions stored in a storage medium (e.g., storage unit 16 or external memory) readable by a machine (e.g., electronic device 100). For example, the machine (e.g., electronic device 100) may call at least one of the stored instructions from the storage medium and execute the same. This makes it possible to operate the machine such that the machine performs at least one function according to the at least one called instruction. The at least one instruction may include a code which is generated by a compiler or a code which can be executed by an interpreter. The machine-readable storage media may be provided in the form of non-transitory storage media. Here, the term "non-transitory" only means that the storage media is a tangible device and does not include a signal, regardless of whether data is semi-permanently or temporarily stored in the storage medium.

According to an embodiment, a method according to various embodiments may be provided while being included in a computer program product. The computer program product may be traded as a product between a seller and a buyer. The computer program product may be distributed as a device-readable storage medium (for example, a compact disc read only memory (CD-ROM)) or may be distributed (for example, downloaded or uploaded) directly or online through an application store (for example, Playstore™) or between two user devices (for example, smartphones). If distributed online, at least a part of the computer program product may be temporarily generated or at least temporarily stored in the device-readable storage medium, such as the memory of the manufacturer's server, a server of the application store, or a relay server.

According to various embodiments, each constituent element (for example, module or program) of the above-described constituent elements may include one entity or multiple entities. According to various embodiments, one or more of the above-described corresponding constituent elements or operations may be omitted, or one or more different constituent elements or operations may be added. Approximately or additionally, multiple constituent elements (for example, modules or programs) may be integrated into a single constituent element. In this case, the integrated constituent element may perform one or more functions of each of the multiple constituent elements in the same or similar manner as being performed by the corresponding one of the multiple constituent elements prior to the integration. According to various embodiments, operations performed by a module, a program, or another constituent element may be executed in a successive, parallel, repeated, or heuristic manner; one or more of the operations may be executed in a different order or omitted; or one or more different operations may be added.

According to one or more embodiments disclosed in this document, a vehicle may display peripheral environment images of a route desired by the user through a display. This increases the degree of satisfaction felt by the vehicle occupants and enables the occupants to have various user experiences inside the vehicle.

Particularly, on the basis of vehicle-related information, a virtual peripheral environment image that reflects the traveling situation of the vehicle is converted and displayed through the display such that the vehicle occupants can feel as if actually traveling along the route. This increases the degree of immersion of the person using the entertainment platform inside the vehicle.

In addition, according to one or more embodiments, the virtual peripheral environment image is selectively displayed through the display based on a user condition such that peripheral environment images can be displayed according to various preferences specific to users.

In addition, according to one or more embodiments, it is possible to enable the vehicle to self-derive along the second route according to the user's input of requesting actual self-driving along the second route. This may increase driving activities of the user and increase the degree of satisfaction felt by the user of the self-driving vehicle.

In addition, according to one or more embodiments, when there is no sub peripheral environment image corresponding to a specific section of the second route, it is possible to generate the sub peripheral environment image corresponding to the specific section by using a sub peripheral environment image corresponding to an adjacent section. This enables the user to seamlessly view the peripheral environment image corresponding to the second route.

In addition, according to one or more embodiments, peripheral environment images can be captured or recorded and transmitted to another person such that the user's experience can be shared with the third person.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. A method for providing an image by an electronic device, the method comprising:
   acquiring a peripheral environment image of a second route based on a user input, wherein the second route is different from a traveling route of a vehicle communicating with the electronic device;
   acquiring vehicle-related information of the vehicle that includes at least one of information regarding the traveling route of the vehicle, information regarding a traveling state of the vehicle, and/or information regarding an environment of the vehicle;
   generating a virtual peripheral environment image that reflects a traveling situation of the vehicle by converting the acquired peripheral environment image of the second route based on the acquired vehicle-related information; and
   providing the generated virtual peripheral environment image to the vehicle.

2. The method of claim 1, wherein the acquiring a peripheral environment image of the second route comprises:
   transmitting second route information resulting from the user input to an external server; and
   acquiring the peripheral environment image of the second route from the external server based on the transmission.

3. The method of claim 1, wherein the method further comprises acquiring a user condition of the virtual peripheral environment image based on another user input of selecting the user condition; and
   wherein the generating of the virtual peripheral environment image further comprises converting the acquired peripheral environment image of the second route based on the acquired vehicle-related information and the user condition.

4. The method of claim 1, wherein the method further comprises:
   acquiring another peripheral environment image at a specific location based on of another user input of selecting the specific location on the second route; and
   providing the other peripheral environment image at the specific location to the vehicle.

5. The method of claim 1, wherein the generating of the virtual peripheral environment image further comprises:
   determining that a sub peripheral environment image corresponding to a specific section along the second route is absent; and
   modifying at least one sub peripheral environment image corresponding to a section adjacent to the specific section so as to generate the sub peripheral environment image corresponding to the specific section.

6. The method of claim 1, wherein the method further comprises:
   controlling the vehicle to self-drive along the second route when the second route is selected to be the traveling route.

7. The method of claim 1, wherein the method further comprises:
    editing the virtual peripheral environment image; and
    sharing the edited virtual peripheral environment image.

8. The method of claim 1, wherein the virtual peripheral environment image is a combination of sub peripheral environment images acquired from different vehicles.

9. The method of claim 1, wherein the information regarding the traveling route of the vehicle includes section attribute information of sections constituting the traveling route of the vehicle;
    the information regarding the traveling state of the vehicle includes at least one of a location of the vehicle, a traveling direction of the vehicle, a traveling time period of the vehicle, and/or a speed of the vehicle; and
    the information regarding the environment of the vehicle includes at least one of weather at a current location of the vehicle, a degree of traffic congestion at the current location of the vehicle, sound in a periphery of the vehicle, and/or a time at which the vehicle is traveling.

10. A method for displaying an image by a vehicle, the method comprising:
    receiving a user input for selecting a second route different from a traveling route of the vehicle;
    acquiring a peripheral environment image of the second route based on the user input;
    acquiring vehicle-related information that includes at least one of information regarding the traveling route of the vehicle, information regarding a traveling state of the vehicle, and/or information regarding an environment of the vehicle;
    generating a virtual peripheral environment image that reflects a traveling situation of the vehicle by converting the acquired peripheral environment image of the second route based on the acquired vehicle-related information; and
    displaying the generated virtual peripheral environment image.

11. An electronic device comprising:
    a memory; and
    a processor electrically connected to the memory;
    wherein the processor is configured to:
    acquire a peripheral environment image of a second route based on a user input, wherein the second route is different from a traveling route of a vehicle communicating with the electronic device,
    acquire vehicle-related information of the vehicle that includes at least one of information regarding the traveling route of the vehicle, information regarding a traveling state of the vehicle, and/or information regarding an environment of the vehicle,
    generate a virtual peripheral environment image that reflects a traveling situation of the vehicle by converting the acquired peripheral environment image of the second route based on the acquired vehicle-related information, and
    provide the generated virtual peripheral environment image to the vehicle.

12. The electronic device of claim 11, wherein the processor is configured to transmit second route information resulting from the user input to an external server, and to acquire the peripheral environment image of the second route from the external server based on the transmission.

13. The electronic device claim 11, wherein, when the electronic device acquires a user condition of the virtual peripheral environment image, the processor is configured to generate the virtual peripheral environment image by converting the acquired peripheral environment image of the second route based on the acquired vehicle-related information and the user condition.

14. The electronic device of claim 11, wherein the processor is configured to acquire another peripheral environment image at a specific location based on another user input of selecting the specific location on the second route, and the processor is configured to provide the other peripheral environment image at the specific location to the vehicle.

15. The electronic device of claim 11, wherein the processor is configured to determine that a sub peripheral environment image corresponding to a specific section along the second route is absent, and to modify at least one sub peripheral environment image corresponding to a section adjacent to the specific section so as to generate the sub peripheral environment image corresponding to the specific section.

16. The electronic device of claim 11, wherein the virtual peripheral environment image is a combination of sub peripheral environment images acquired from different vehicles.

17. The electronic device of claim 11, wherein the information regarding the traveling route of the vehicle includes section attribute information of sections constituting the traveling route of the vehicle;
    the information regarding the traveling state of the vehicle includes at least one of a location of the vehicle, a traveling direction of the vehicle, a traveling time period of the vehicle, and/or a speed of the vehicle; and
    the information regarding the environment of the vehicle includes at least one of weather at a current location of the vehicle, a degree of traffic congestion at the current location of the vehicle, sound in a periphery of the vehicle, and/or a time at which the vehicle is traveling.

18. A vehicle comprising:
    a user input circuitry capable of receiving a user input;
    a display capable of displaying an image;
    a driving circuitry configured to control traveling of the vehicle; and
    a processor electrically connected to the user input circuitry, the display, and the driving circuitry, wherein the processor is configured to:
    acquire a peripheral environment image of a second route based on the user input, wherein the second route is different from a traveling route of the vehicle through the user input circuitry;
    acquire vehicle-related information of the vehicle that includes at least one of information regarding the traveling route of the vehicle, information regarding a traveling state of the vehicle, and/or information regarding an environment of the vehicle;
    generate a virtual peripheral environment image that reflects a traveling situation of the vehicle by converting the acquired peripheral environment image of the second route based on the acquired vehicle-related information; and
    provide the generated virtual peripheral environment image to the display.

19. The vehicle of claim 18, wherein the driving circuitry is configured to control the vehicle to self-drive along the second route when the second route is selected to be the traveling route through the user input circuitry.

20. A non-transitory computer program product comprising a computer-readable storage medium comprising instructions configured to cause an electronic device communicating with a vehicle to:

acquire a peripheral environment image of a second route based on a user input, wherein the second route is different from a traveling route of the vehicle;

acquire vehicle-related information of the vehicle that includes at least one of information regarding the traveling route of the vehicle, information regarding a traveling state of the vehicle, and/or information regarding an environment of the vehicle;

generate a virtual peripheral environment image that reflects a traveling situation of the vehicle by converting the acquired peripheral environment image of the second route based on the acquired vehicle-related information; and provide the generated virtual peripheral environment image to the vehicle.

* * * * *